(12) United States Patent
Noda et al.

(10) Patent No.: US 7,477,742 B2
(45) Date of Patent: Jan. 13, 2009

(54) METHOD AND APPARATUS FOR CONTROLLING CONTENTS UTILIZATION, AND A COMPUTER PRODUCT

(75) Inventors: Bintatsu Noda, Kawasaki (JP); Seigo Kotani, Kawasaki (JP); Takehiko Hayashi, Kawasaki (JP); Jun Kamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 736 days.

(21) Appl. No.: 09/799,010

(22) Filed: Mar. 6, 2001

(65) Prior Publication Data
US 2002/0003883 A1 Jan. 10, 2002

(30) Foreign Application Priority Data
Jul. 6, 2000 (JP) ............................. 2000-205755

(51) Int. Cl.
*H04N 7/167* (2006.01)
*H04K 1/00* (2006.01)

(52) U.S. Cl. ......................................... 380/232; 705/59

(58) Field of Classification Search .................. 713/201, 713/200; 380/201, 232; 705/59
See application file for complete search history.

(56) References Cited

U.S. PATENT DOCUMENTS

| 6,195,432 | B1 * | 2/2001 | Takahashi et al. | 380/277 |
|---|---|---|---|---|
| 6,209,787 | B1 * | 4/2001 | Iida | 235/381 |
| 6,374,036 | B1 * | 4/2002 | Ryan et al. | 386/94 |
| 6,707,889 | B1 * | 3/2004 | Saylor et al. | 379/88.04 |
| 6,772,133 | B1 * | 8/2004 | Kambayashi et al. | 705/57 |
| 6,920,567 | B1 * | 7/2005 | Doherty et al. | 726/22 |

* cited by examiner

*Primary Examiner*—Kambiz Zand
*Assistant Examiner*—Aubrey H Wyszynski
(74) *Attorney, Agent, or Firm*—Staas & Halsey LLP

(57) ABSTRACT

A contents utilization control apparatus includes an input unit for inputting a) contents with control module that consist of contents and a control module, and b) a license with control module that consists of a license prepared from contents utilization approval information and a control module. The control module in the contents with control module and the control module in the license with control module cooperate with each other to carry out a control relating to the utilization of the contents.

15 Claims, 26 Drawing Sheets

METHOD AND APPARATUS FOR CONTROLLING CONTENTS UTILIZATION, AND A COMPUTER PRODUCT

FIELD OF THE INVENTION

The present invention in general relates to a technology for controlling the utilization of contents of a picture, music, a video, etc. More particularly, this invention relates to a technology with which it is possible to increase the flexibility in the utilization of the contents and facilitate charge management.

BACKGROUND OF THE INVENTION

In recent years, along with the starting of the Internet distribution of digitized contents of pictures and music based on the readily available multimedia, there has been an increasing trend of users' showing high interest in utilizing the contents. In order to meet the users' needs, means and methods for controlling the contents utilization with high flexibility have been in high demand.

Conventionally, contents of pictures and music (copyright) have not been able to be sold or transferred for making profit without the approval from the copyright owners. The contents in this case refers to the digital contents having a structure as a collection of bit strings that can be recorded onto a single recording medium. They include sentence texts, still images, dynamic images, program software, etc.

The contents of this type are provided to users from the download sites on the Internet or by a recording medium. In providing and utilizing the contents, a control for the utilization of contents (hereinafter to be referred to as a contents utilization control) is carried out using a license (utilization approval information) aiming at the protection of the copyright. This contents utilization control is for enabling only the legally approved users to utilize the contents.

Further, a contents utilization control apparatus that controls the utilization of the contents is set with an own environment for the utilization of the license and the contents. In this environment of utilization, the contents utilization control apparatus is set with apparatus identification to identify the contents utilization control apparatus. Therefore, the contents utilization control apparatus controls the utilization of the contents by decoding the contents based on the apparatus identification information and the license. For utilizing the charged contents, the users are charged. Conventionally, the providers of the contents have managed this charging.

As explained above, the conventional contents utilization control apparatus provides contents and license that have been prepared to meet the environment of the apparatus that utilizes the contents. As the contents and license largely depend on the environment of the contents utilization control apparatus that utilizes the contents utilization control apparatus, users cannot carry out a flexible utilization of the contents. Further, as the contents and license must be prepared individually, the providers of the contents have also had to bear a heavy burden.

Furthermore, as the license cannot have charge information, the contents providers have had to manage the charging for the contents utilization. This charge management has also been a very troublesome work.

SUMMARY OF THE INVENTION

It is an object of the present invention to provide a contents utilization control apparatus capable of increasing the flexibility in the utilization of the contents and capable of facilitating a management of charge for the utilization of the contents, a contents utilization control method therefore, and a computer-readable recording medium recorded with a contents utilization control program therefore.

The contents utilization control apparatus according to one aspect of the present invention controls the utilization of the contents provided from the contents provision right owner to the users of the contents. This contents utilization control apparatus is equipped with the input unit for inputting contents with control module that consist of contents and a first control module, and a license with control module that consists of a license prepared from contents utilization approval information, and a second control module. The first control module and the second control module cooperate with each other to carry out a control relating to the utilization of the contents.

According to this invention, it is possible to carry out a control relating to the utilization of the contents based on a mutual link of the first control module and the second control module. Therefore, it becomes possible to carry out a flexible utilization of the contents, without depending on the environment of the apparatus that utilizes the contents like the conventional practice.

Other objects and features of this invention will become apparent from the following description with reference to the accompanying drawings.

DESCRIPTION OF THE PREFERRED EMBODIMENTS

A contents utilization control apparatus, a contents utilization control method, and a computer-readable recording medium recorded with a contents utilization control program, in one embodiment of the present invention will be explained in detail below with reference to the drawings.

Figure 1A:
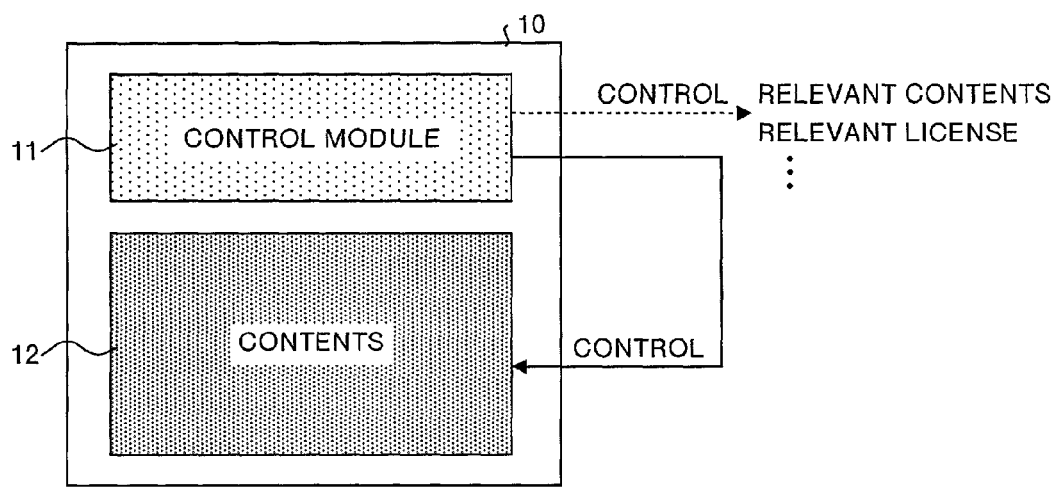
FIG. 1A and FIG. 1B are diagrams showing contents with control module 10 and a license with control module 20 that are used in one embodiment relating to the present invention.
Figure 1B:
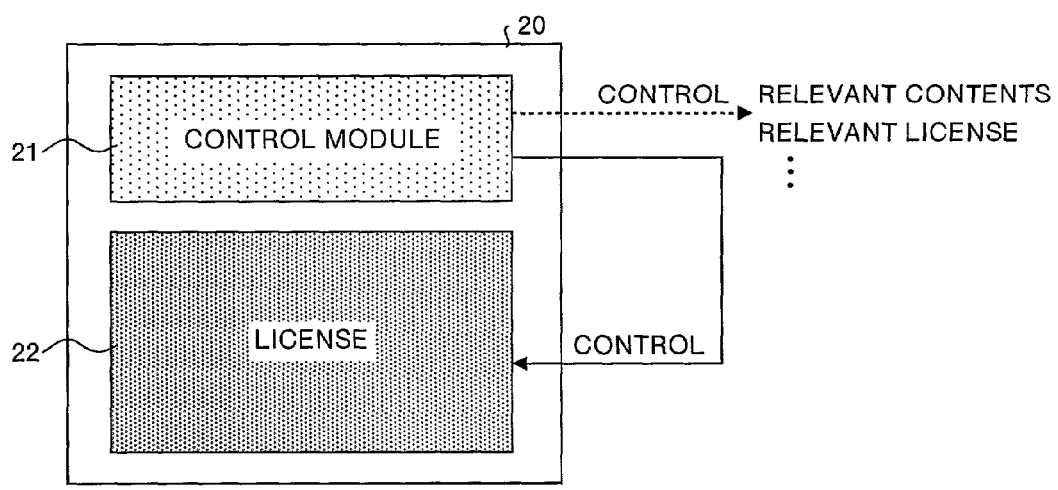

First, various kinds of structures of contents with control module and license with control module that are used in the embodiment relating to the present invention will be explained with reference to FIG. 1A to FIG. 4B. FIG. 1A and FIG. 1B are diagrams showing contents with control module 10 and a license with control module 20. The contents with control module 10 and the license with control module 20 are provided to users from providers of the contents via a recording medium, the Internet, or the like.

The contents with control module 10 shown in FIG. 1A consists of a control module 11 and contents 12. The control module 11 is for dynamically controlling the contents 12, a control module 21 (refer to FIG. 1B), and an external module not shown. The control module 11 is a file of a source code format. Therefore, in order to start the control module 11, it is necessary to compile the control module 11 in an execution format file (exe file). The contents 12 are the information such as music, a video, sound, etc.

The license with control module 20 shown in FIG. 1B consists of the control module 21 and a license 22. The control module 21 is for dynamically controlling the license 22, the control module 11 (refer to FIG. 1A), and an external module. The control module 21 is a file of a source code format. Therefore, in order to start the control module 21, it is necessary to compile the control module 21 in an execution format file (exe file). The license 22 is the information for approving the utilization of the contents 12. Therefore, users cannot utilize (regenerate) the contents 12 unless they obtain both the contents 12 and the license 22.

Figure 2A:
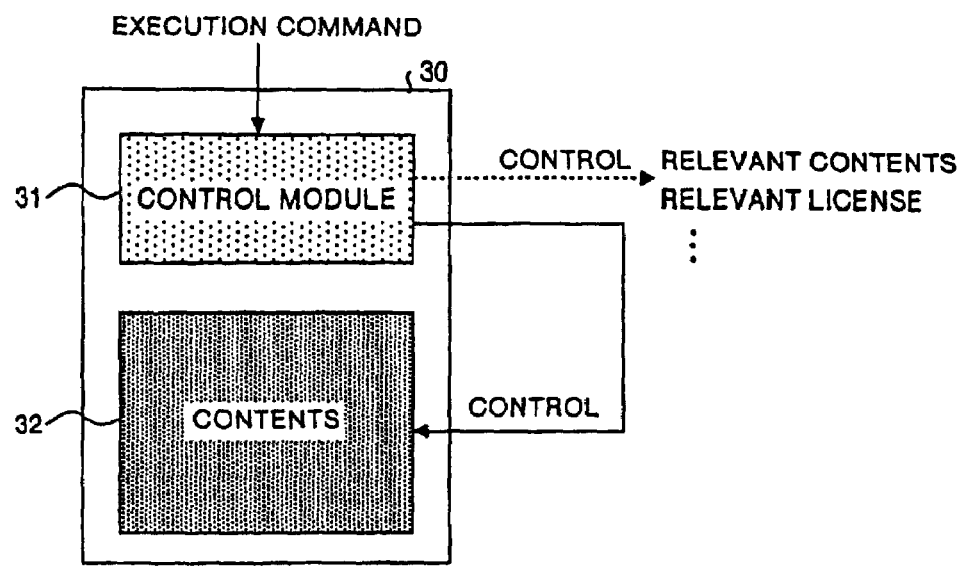
FIG. 2A and FIG. 2B are diagrams showing contents with control module 30 and a license with control module 40 that are used in the same embodiment.
Figure 2B:
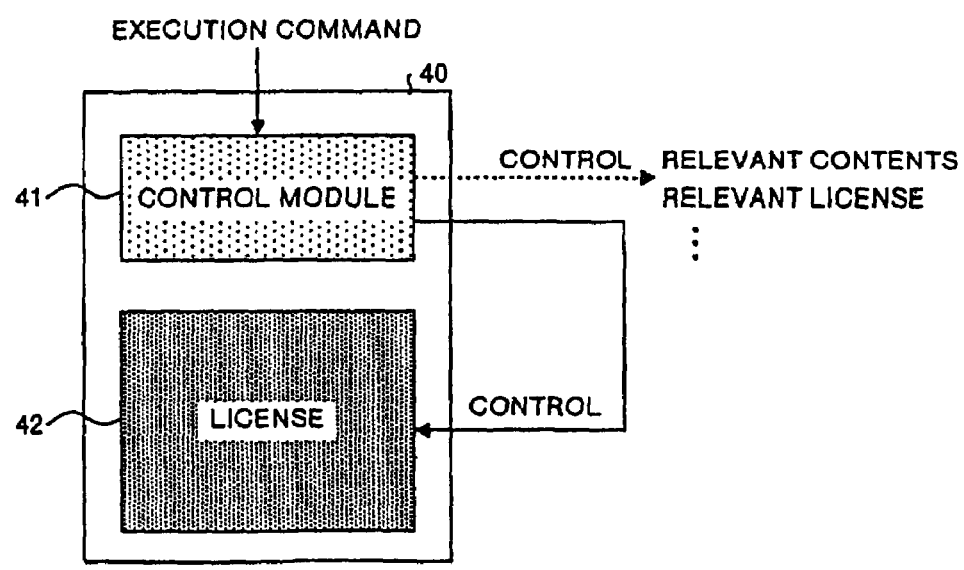

FIG. 2A and FIG. 2B are diagrams showing contents with control module 30 and a license with control module 40. The contents with control module 30 and the license with control module 40 are provided to users from contents providers via a recording medium, the Internet, or the like.

The contents with control module 30 shown in FIG. 2A consists of a control module 31 and contents 32. The control module 31 is for dynamically controlling the contents 32, a control module 41 (refer to FIG. 2B), and an external module not shown. The control module 31 is a file of an execution format (exe file), and is started by an execution command. Therefore, it is not necessary to compile the control module 31. The contents 32 are the information such as music, a video, sound, etc.

The license with control module 40 shown in FIG. 2B consists of the control module 41 and a license 42. The control module 41 is for dynamically controlling the license 42, the control module 31 (refer to FIG. 2A), and an external module. The control module 41 is a file of an execution format (exe file), and is started by an execution command. Therefore, it is not necessary to compile the control module 41. The license 42 is the information for approving the utilization of the contents 32. Therefore, users cannot utilize (regenerate) the contents 32 unless they obtain both the contents 32 and the license 42.

Figure 3A:
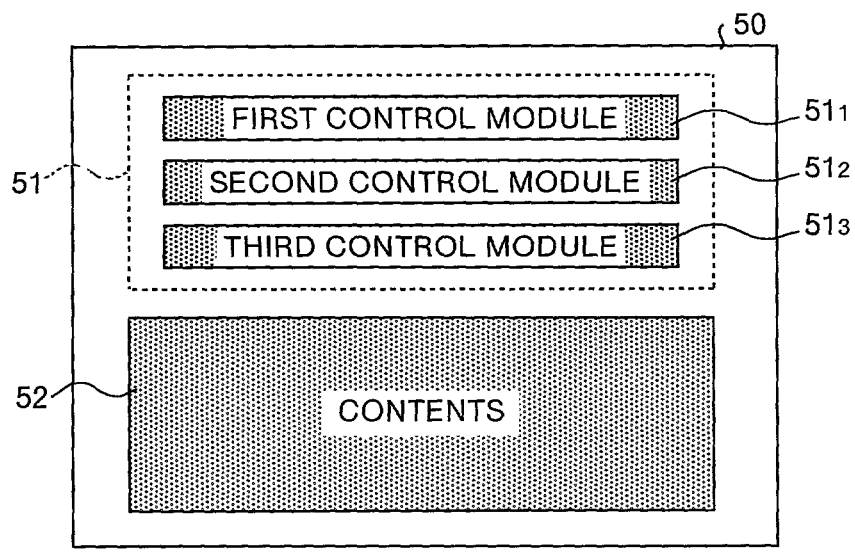
FIG. 3A and FIG. 3B are diagrams showing contents with control module 50 and a license with control module 60 that are used in the same embodiment.
Figure 3B:
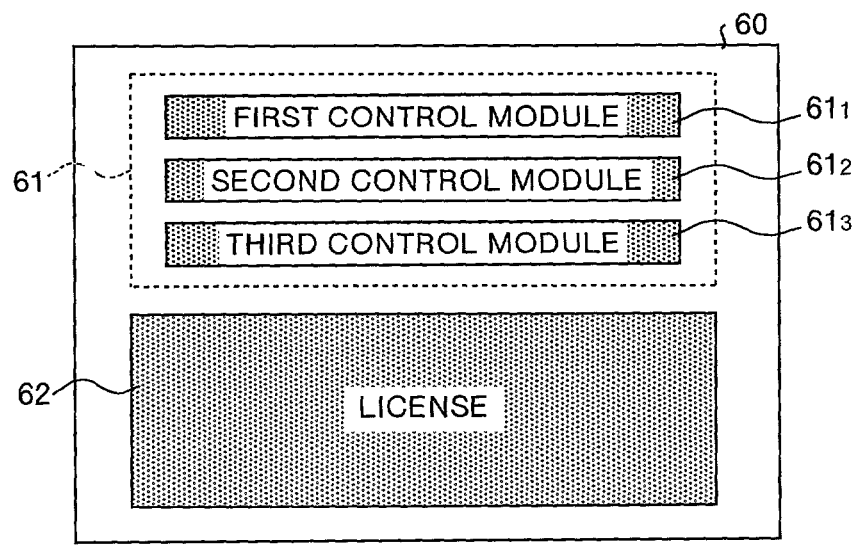

FIG. 3A and FIG. 3B are diagrams showing contents with control module 50 and a license with control module 60. The contents with control module 50 and the license with control module 60 are provided to users from contents providers via a recording medium, the Internet, or the like.

The contents with control module 50 shown in FIG. 3A consists of a control module 51 and contents 52. The control module 51 consists of three kinds of control modules, that is, a first control module $51_1$ to a third control module $51_3$. This control module 51 is for dynamically controlling the contents 52, a control module 61 (refer to FIG. 3B), and an external module not shown. The first control module $51_1$ to the third control module $51_3$ are for realizing a plurality of kinds of controls according to a combination with a first control module $61_1$ to a third control module $61_3$ to be described later (for example, the first control module $51_1$ and the second control module $61_2$). The contents 52 are the information such as music, a video, sound, etc.

The license with control module 60 shown in FIG. 3B consists of the control module 61 and license 62. The control module 61 consists of the three kinds of control modules, that is, the first control module $61_1$ to a third control module $61_3$. This control module 61 is for dynamically controlling the license 62, the control module 51 (refer to FIG. 3A), and an external module.

The first control module $61_1$ to the third control module $61_3$ are for realizing a plurality of kinds of controls according to a combination with the first control module $51_1$ to the third control module $51_3$ (for example, the first control module $51_1$ and the second control module $61_2$). The license 62 is the information for approving the utilization of the contents 52. Therefore, users cannot utilize (regenerate) the contents 52 unless they obtain both the contents 52 and the license 62.

Figure 4B:
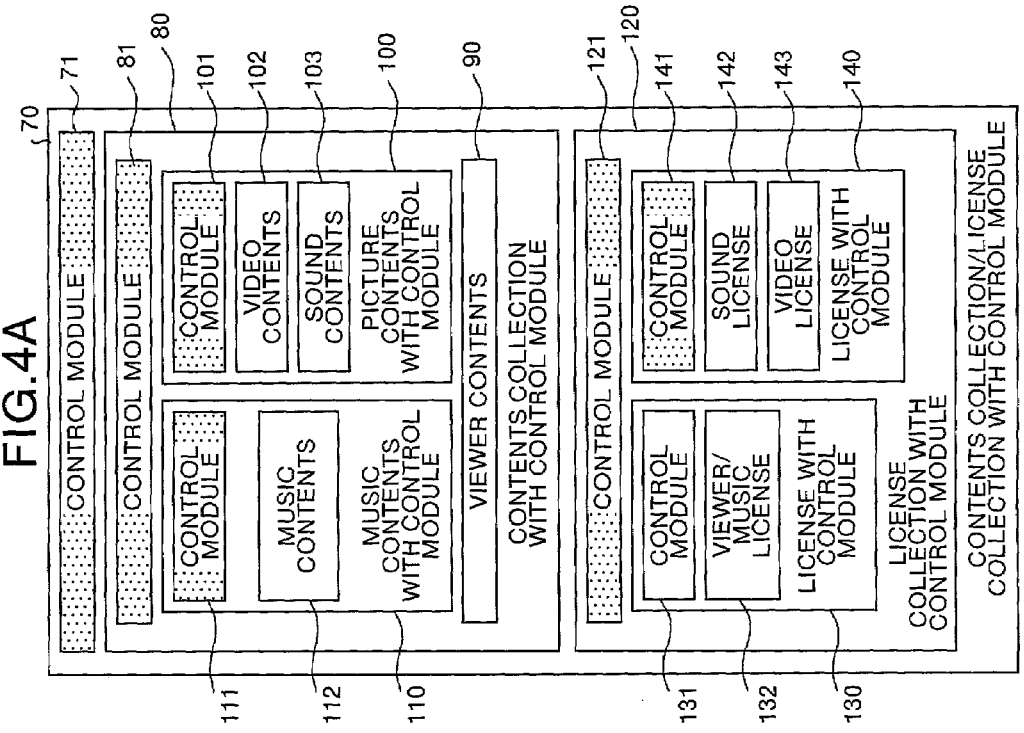
FIG. 4A and FIG. 4B are diagrams showing contents collection/license collection with control module 70 that is used in the same embodiment.
Figure 4A:
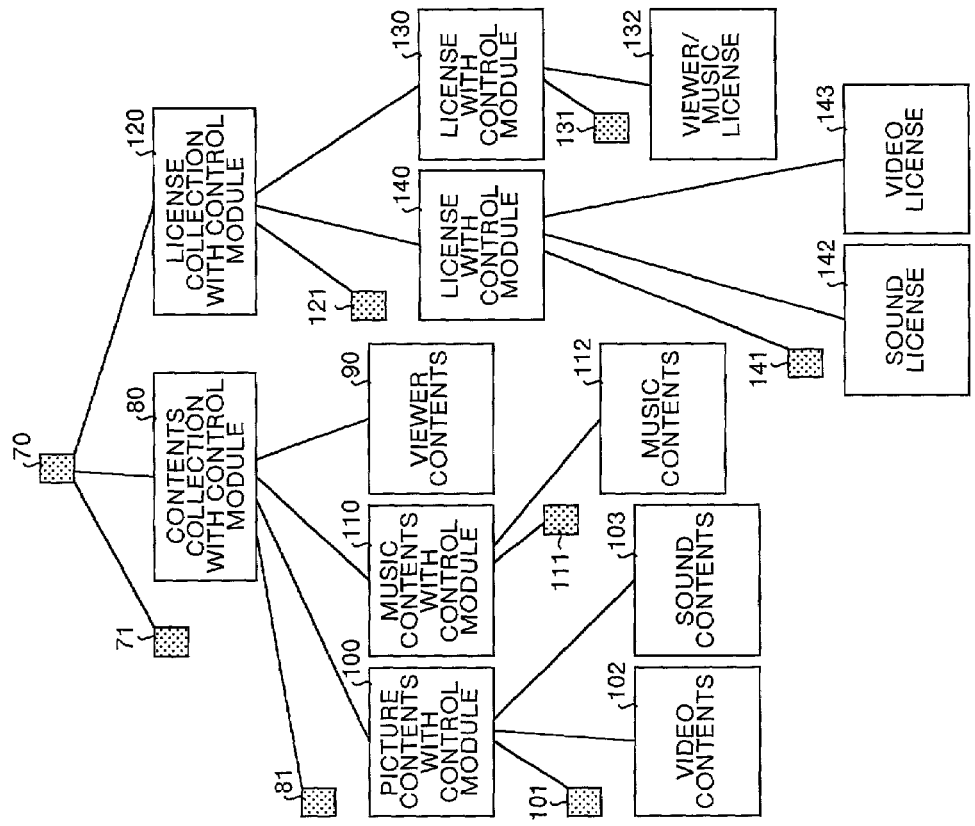

FIG. 4A shows a structure of a contents collection/license collection with control module 70. As shown in FIG. 4B, this contents collection/license collection with control module 70 consists of a plurality of contents (a contents collection) that forms a hierarchical structure, a plurality of licenses (a license collection) that correspond to these plurality of contents, and a plurality of control modules that correspond to the plurality of contents and licenses. This contents collection/license collection with control module 70 is stored as one file. The contents collection/license collection with control module 70 is provided to users from contents suppliers via a recording medium, the Internet, or the like.

In more detail, the contents collection/license collection with control module 70 consists of a control module 71, a contents collection with control module 80, and a license collection with control module 120. As shown in FIG. 4B, the control module 71 controls an extraction of the contents collection with control module 80 and the license collection with control module 120 from the contents collection/license collection with control module 70.

The contents collection with control module 80 consists of a control module 81, viewer contents 90, picture contents with control module 100, and music contents with control module 110. The control module 81 controls an extraction of the viewer contents 90, the picture contents with control module 100, and the music contents with control module 110 from the contents collection with control module 80.

The viewer contents 90 are the contents prepared from a view, and the viewer contents 90 can be utilized based on a viewer/music license 132 to be described later. The picture contents with control module 100 consist of a control module 101, video contents 102, and sound contents 103. The control module 101 is for dynamically controlling the video contents 102, the sound contents 103, a control module 141 to be described later, and an external control module (not shown).

The video contents 102 are the contents prepared from videos that constitute a picture. The picture contents 102 can be utilized based on a video license 143 to be described later. The sound contents 103 are the contents prepared from sounds that constitute a picture. The sound contents 103 can be utilized based a sound license 142 to be described later. The music contents with control module 110 consists of a control module 111 and music contents 112.

The control module 111 is for dynamically controlling the music contents 112, a control module 131 to be described later, and an external module (not shown). The music contents 112 are the contents prepared from music. The music contents 112 can be utilized based on a viewer/music license 132 to be described later.

On the other hand, the license collection with control module 120 consists of a control module 121, a license with control module 130, and a license with control module 140. The control module 121 controls an extraction of the license with control module 130 and the license with control module 140 from the license collection with control module 120.

The license with control module 130 consists of a control module 131, and the viewer/music license 132. The control module 131 is for dynamically controlling the viewer/music license 132, the control module 81, the control module 111, and an external module (not shown). The viewer/music license 132 is utilization approval information for approving the utilization of the music contents 112, and the viewer contents 90.

The license with control module 140 consists of the control module 141, a sound license 142, and a video license 143. The control module 141 is for dynamically controlling the sound license 142, the video license 143, the control module 101, and an external module (not shown) The sound license 142 is utilization approval information for approving the utilization of the video contents 102.

Figure 5:
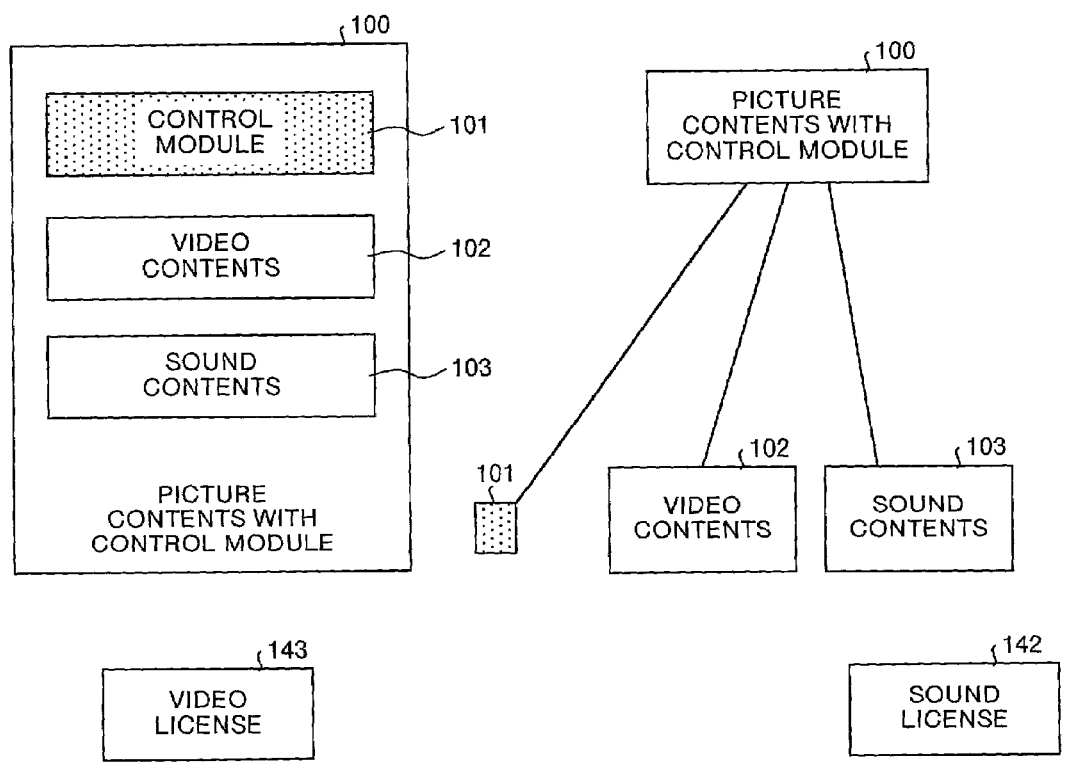
FIG. 5 is a diagram for explaining the operation of the same embodiment.

In the contents collection/license collection with control module 70 shown in FIG. 4A, a desired contents collection with control module and a desired license collection with control module are extracted, and they are utilized/distributed. Assume that the picture contents with control module 100 and the corresponding license with control module 140 have been extracted from the contents collection/license collection with control module 70, for example. Then, as shown in FIG. 5, the control module 101 (refer to FIG. 4A) of the picture contents with control module 100 and the control module 141 (refer to FIG. 4A) mutually cooperate to utilize the video contents 102 and the music contents 103 using the sound license 142 and the vide license 143.

Examples of a construction for utilizing the contents based on the above-described license with control module and control module (refer to FIG. 1A to FIG. 4B) will be explained below with reference to FIG. 6 to FIG. 11. FIG. 6 to FIG. 11 are block diagrams showing construction examples 1 to 6 of the embodiment relating to the present invention respectively.

Figure 6:
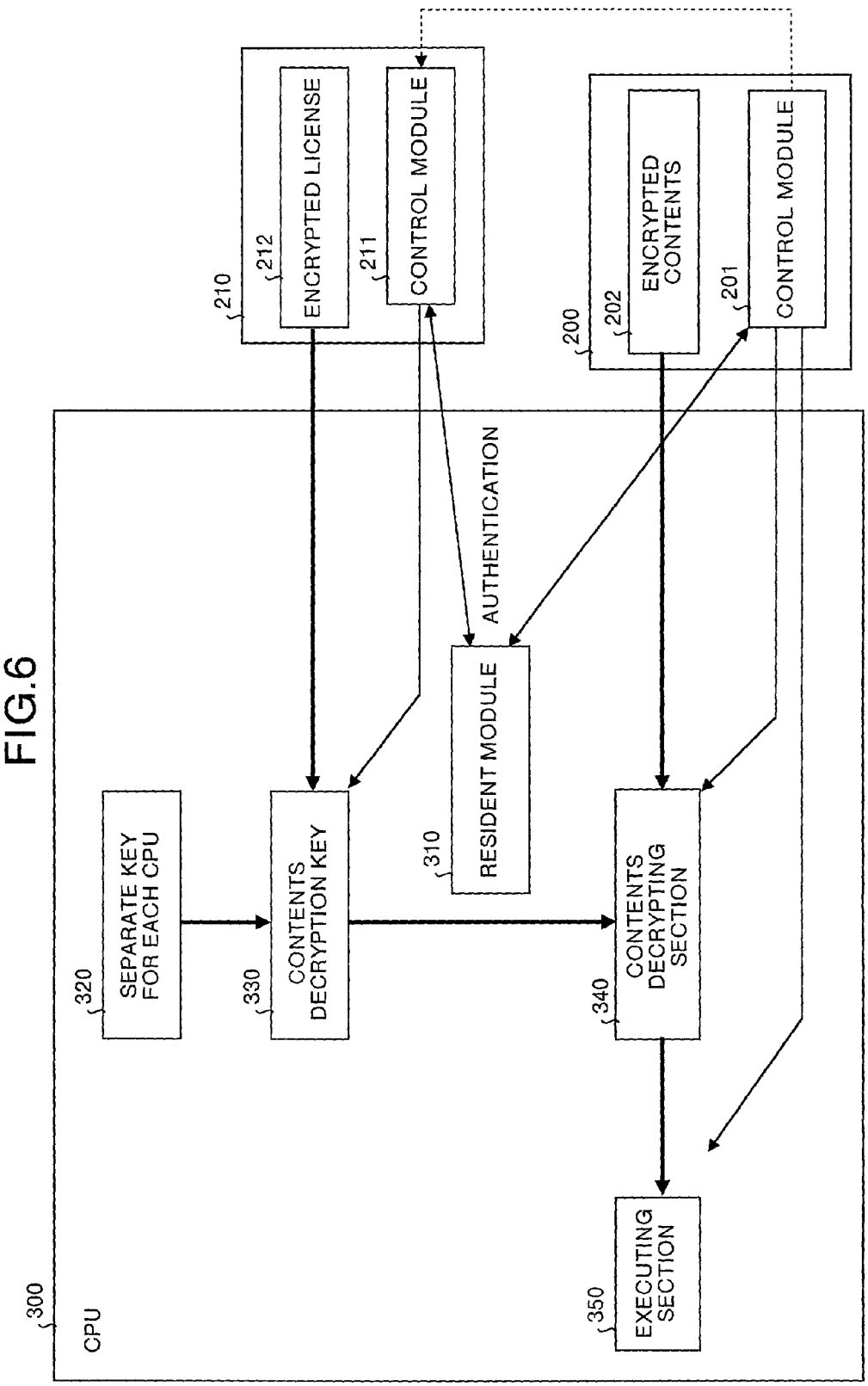
FIG. 6 is a block diagram showing a construction example 1 of the same embodiment.

First, a construction example 1 of the embodiment will be explained with reference to FIG. 6. In FIG. 6, a CPU (Central Processing Unit) 300 generates a contents decryption key 330 by decrypting an encrypted license 212 based on license with control module 210 and contents with control module 200. Then, the CPU 300 executes contents (for example, a computer program) obtained by decrypting encrypted contents 202 using this contents decryption key 330.

The contents with control module 200 correspond to the contents with control module 10 (refer to FIG. 1A), and are input to the CPU 300 via a recording medium or the Internet (not shown). The contents with control module 200 consist of a control module 201 and encrypted contents 202. The control module 201 is equipped with a function similar to that of the control module 11 (refer to FIG. 1A). The encrypted contents 202 are the contents that have been encrypted (for example, a computer program).

The license with control module 210 corresponds to the license with control module 20 (refer to FIG. 1B), and is input to the CPU 300 via a recording medium or the Internet. The license with control module 210 consists of a control module 211 and an encrypted license 212. The control module 211 is equipped with a function similar to that of the control module 21 (refer to FIG. 1B). The encrypted license 212 is a license having encrypted the contents decryption key 330 that is used for decrypting the encrypted contents 202.

In the CPU 300, a resident module 310 (corresponding to a third control module in the "WHAT IS CLAIMED IS") is equipped with a function of authenticating whether the control module 211 and the control module 201 are normal ones or not. A CPU individual key 320 has been allocated to the corresponding CPU 300 in advance, and this key is used for decrypting the encrypted license 212. The contents decryption key 330 is a key having the encrypted license 212 decrypted using the CPU individual key 320, and this contents decryption key 330 is used for decrypting the encrypted contents 202. A contents decrypting section 340 decrypts the encrypted contents 202 using the contents decryption key 330. An executing section 350 executes the contents obtained by decrypting the encrypted contents 202.

Figure 12:
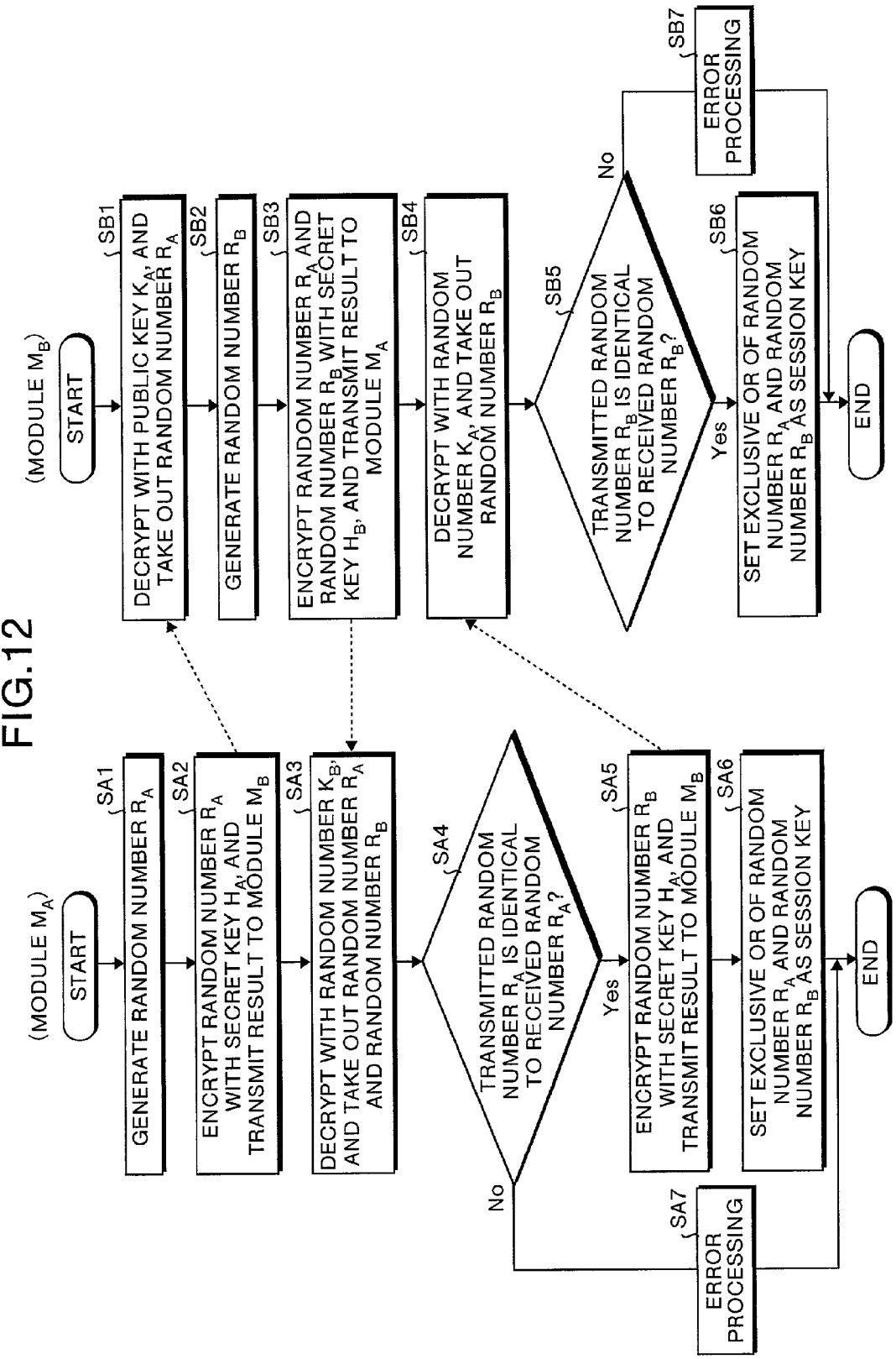
FIG. 12 is a flowchart for explaining the operation of the same embodiment.

The operation of the construction example 1 shown in FIG. 6 will be explained next with reference to a flowchart shown in FIG. 12. In FIG. 12, step SA1 to step SA7 express a process of an authentication operation of a module $M_A$ (corresponding to the resident module 310 in FIG. 6). Step SB1 to step SB7 express a process of an authentication operation of a module $M_B$ (corresponding to the control module 211 and the control module 201 in FIG. 6). When the contents with control module 200 and the license with control module 210 have been input to the CPU 300 shown in FIG. 6, an authentication operation is carried out among the resident module 310 (FIG. 12: module $M_A$), the control module 201, and the control module 211 (FIG. 12: module $M_B$).

At step SA1 shown in FIG. 12, the resident module 310 (module $M_A$) generates a random number $R_A$. At step SA2, the resident module 310 encrypts the random number $R_A$ with a secret key $H_A$, and transmits the encrypted random number to the control module 201 (module $M_B$). Upon receiving the encrypted random number $R_A$, the control module 201 decrypts the encrypted random number $R_A$ with a public key $K_A$, and takes out the random number $R_A$, at step SB1. At step SB2, the control module 201 generates a random number $R_B$.

At step SB3, the control module 201 encrypts the random number $R_A$ and the random number $R_B$ with a secret key $H_B$ respectively, and transmits the encrypted random numbers to the resident module 310. Upon receiving the encrypted random number $R_A$ and the encrypted random number $R_B$, the resident module 310 decrypts the encrypted random number $R_A$ and the encrypted random number $R_B$ with a public key $K_B$, and takes out the random number $R_A$ and the random number $R_B$, at step SA3. At step SA4, the resident module 310 makes a decision as to whether or not the random number $R_A$ (generated at step SA1) transmitted to the control module 201 is the same as the received random number $R_A$ (decrypted at step SA3).

When a result of the decision made at step SA4 is "No", the resident module 310 regards the control module 201 as not a normal control module, that is, this control module 201 has not been authenticated, and executes an error processing at step SA7. In this case, when a result of the decision made at step SA4 is "Yes", that is, this control module 201 has been authenticated, the resident module 310 encrypts the random number $R_B$ with the secret key $H_A$, and transmits the encrypted random number $R_B$ to the control module 201, at step SA5. At step SA6, the resident module 310 sets an exclusive OR of the random number $R_A$ and the random number $R_B$ as a session key.

Upon receiving the encrypted random number $R_B$, the control module 201 decrypts the encrypted random number $R_B$ with the public key $K_A$, and takes out the random number $R_B$, at step SB4. At step SB5, the control module 201 makes a decision as to whether or not the random number $R_B$ (generated at step SB2) transmitted to the resident module 310 is the same as the received random number $R_B$ (decrypted at step SB4)

When a result of the decision made at step SB5 is "No", the control module 201 regards the resident module 310 as not a normal resident module, that is, this resident module 310 has not been authenticated, and executes an error processing at step SB7. In this case, when a result of the decision made at step SB5 is "Yes", that is, the resident module 310 and the control module 201 have been mutually authenticated, the control module 201 sets an exclusive OR of the random number $R_A$ and the random number $R_B$ as a session key, at step SB6.

In the mean time, an authentication operation is also carried out between the resident module 310 and the control module 211 in a similar manner to the authentication operation carried out between the resident module 310 and the control module 201. In this case, it is assumed that the resident module 310 and the control module 211 have been mutually authenticated.

Next, the resident module 310 shown in FIG. 6 decrypts the encrypted license 212 using the CPU individual key 320, thereby to generate the contents decryption key 330, and transmits the contents decryption key 330 to the contents decrypting section 340. Then, the contents decrypting section 340 decrypts the encrypted contents 202 using the contents decryption key 330, and transmits the decrypted result (contents) to the executing section 350. The executing section 350 executes the contents (for example, a computer program).

Figure 7:
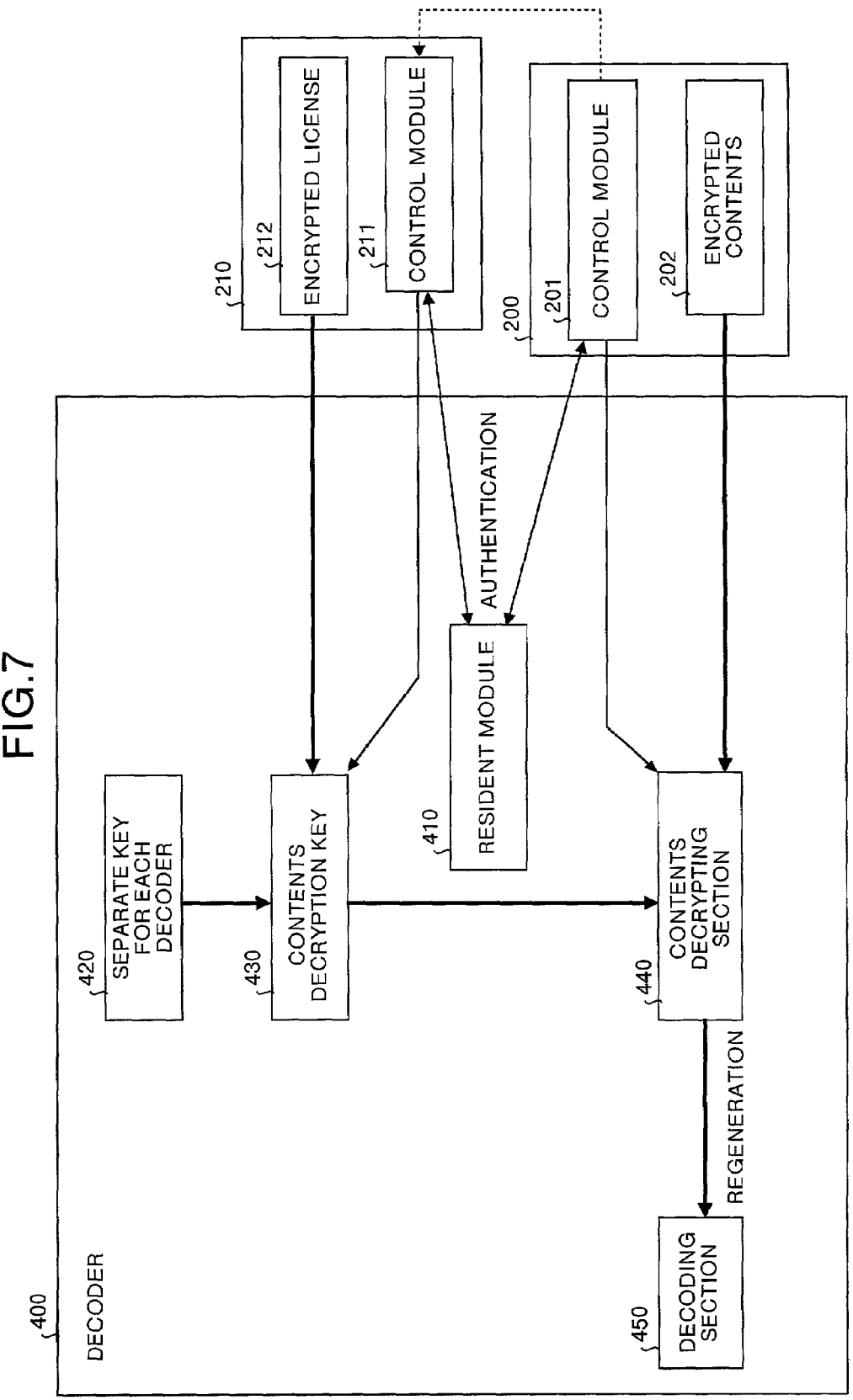
FIG. 7 is a block diagram showing a construction example 2 of the same embodiment.

Next, a construction example 2 of the embodiment will be explained in detail with reference to FIG. 7. In FIG. 7, portions corresponding to those in FIG. 6 are attached with identical symbols. In FIG. 7, a decoder 400 is provided in place of the CPU shown in FIG. 6. The decoder 400 decrypts an encrypted license 212 based on a license with control module 210 and contents with control module 200, thereby to generate a contents decryption key 430. The decoder 400 then decodes the contents obtained by decrypting the encrypted contents 202 using the contents decryption key 430.

In the decoder 400, a resident module 410 is equipped with functions (an authentication function and the like) similar to those of the resident module 310 (refer to FIG. 6). A decoder individual key 420 has been allocated to the corresponding decoder 400 in advance, and this key is used for decrypting the encrypted license 212. The contents decryption key 430 is a key having the encrypted license 212 decrypted using the decoder individual key 420, and this contents decryption key 430 is used for decrypting the encrypted contents 202. A contents decrypting section 440 decrypts the encrypted contents 202 using the contents decryption key 430. A decoding section 450 decodes the contents obtained by decrypting the encrypted contents 202.

The operation of the construction example 2 shown in FIG. 7 will be explained next with reference to the flowchart shown in FIG. 12. In FIG. 12, step SA1 to step SA7 express a process of an authentication operation of a module $M_A$ (corresponding to the resident module 410 in FIG. 7). Step SB1 to step SB7 express a process of an authentication operation of a module $M_B$ (corresponding to a control module 211 and a control module 201 in FIG. 7). When the contents with control module 200 and the license with control module 210 have been input to the decoder 400 shown in FIG. 7, an authentication operation is carried out among the resident module 410 (FIG. 12: module $M_A$), the control module 201, and the control module 211 (FIG. 12: module $M_B$).

At step SA1 shown in FIG. 12, the resident module 410 (module $M_A$) generates a random number $R_A$. At step SA2, the resident module 410 encrypts the random number $R_A$ with a secret key $H_A$, and transmits the encrypted random number to the control module 201 (module $M_B$). Upon receiving the encrypted random number $R_A$, the control module 201 decrypts the encrypted random number $R_A$ with a public key $K_A$, and takes out the random number $R_A$, at step SB1. At step SB2, the control module 201 generates a random number $R_B$.

At step SB3, the control module 201 encrypts the random number $R_A$ and the random number $R_B$ with a secret key $H_B$ respectively, and transmits the encrypted random numbers to the resident module 410. Upon receiving the encrypted random number $R_A$ and the encrypted random number $R_B$, the resident module 410 decrypts the encrypted random number $R_A$ and the encrypted random number $R_B$ with a public key $K_B$, and takes out the random number $R_A$ and the random number $R_B$, at step SA3. At step SA4, the resident module 410 makes a decision as to whether or not the random number $R_A$ (generated at step SA1) transmitted to the control module 201 is the same as the received random number $R_A$ (decrypted at step SA3).

When a result of the decision made at step SA4 is "No" the resident module 410 regards the control module 201 as not a normal control module, that is, this control module 201 has not been authenticated, and executes an error processing at step SA7. In this case, when a result of the decision made at step SA4 is "Yes", that is, this control module 201 has been authenticated, the resident module 410 encrypts the random number $R_B$ with the secret key $H_A$, and transmits the encrypted random number $R_B$ to the control module 201, at step SA5. At step SA6, the resident module 410 sets an exclusive OR of the random number $R_A$ and the random number $R_B$ as a session key.

Upon receiving the encrypted random number $R_B$, the control module 201 decrypts the encrypted random number $R_B$ with the public key $K_A$, and takes out the random number $R_B$, at step SB4. At step SB5, the control module 201 makes a decision as to whether or not the random number $R_B$ (generated at step SB2) transmitted to the resident module 410 is the same as the received random number $R_B$ (decrypted at step SB4).

When a result of the decision made at step SB5 is "No", the control module 201 regards the resident module 310 as not a normal resident module, that is, this resident module 310 has not been authenticated, and executes an error processing at step SB7. In this case, when a result of the decision made at step SB5 is "Yes", that is, the resident module 410 and the control module 201 have been mutually authenticated, the control module 201 sets an exclusive OR of the random number $R_A$ and the random number $R_B$ as a session key, at step SB6.

In the mean time, an authentication operation is also carried out between the resident module 410 and the control module 211 in a similar manner to the authentication operation carried out between the resident module 410 and the control module 201. In this case, it is assumed that the resident module 410 and the control module 211 have been mutually authenticated.

Next, the resident module 410 shown in FIG. 7 decrypts the encrypted license 212 using the decoder individual key 420, thereby to generate the contents decryption key 430, and transmits the contents decryption key 430 to the contents decrypting section 440. Then, the contents decrypting section 440 decrypts the encrypted contents 202 using the contents decryption key 430, and transmits the decrypted result (contents) to the decoding section 450. The decoding section 450 decodes the contents.

Figure 8:
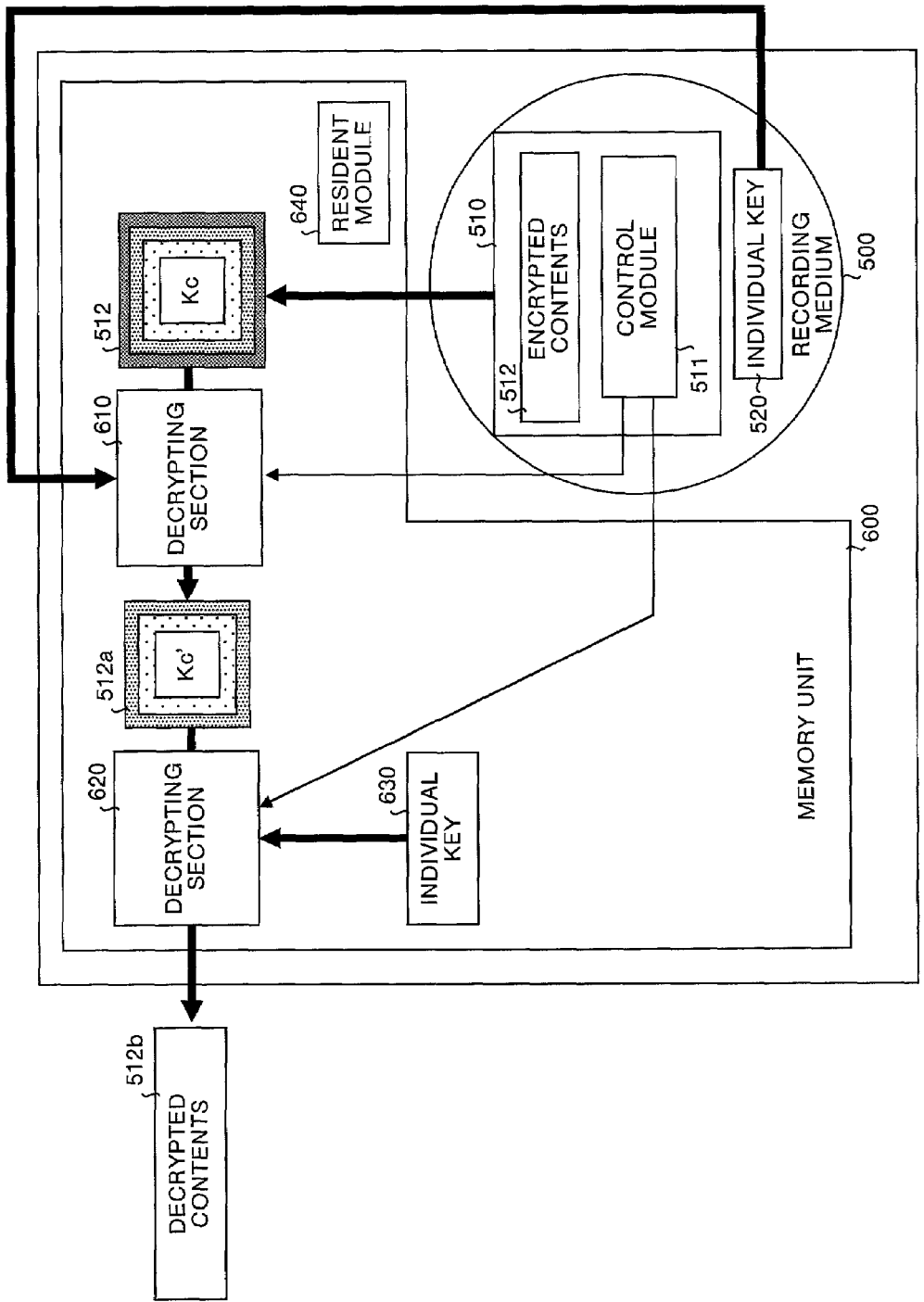
FIG. 8 is a block diagram showing a construction example 3 of the same embodiment.

Next, a construction example 3 of the embodiment will be explained in detail with reference to FIG. 8. In FIG. 8, a recording medium 500 is an optical disk, a floppy disk, or the like, for recording contents with control module 510 and an individual key 520. The contents with control module 510 consist of a control module 511, and encrypted contents 512. The control module 511 has functions similar to those of the control module 11 (refer to FIG. 1A), and executes an authentication processing and the like between the control module 511 and a resident module 640 to be described later 640. The encrypted contents 512 are encrypted in double by a key Kc and a key Kc'. The individual key 520 is a key for decrypting the encrypted contents 512.

A memory unit 600 is equipped with a function of reading the contents with control module 510 and the individual key 520 from the recording medium 500, and a function of decrypting the encrypted contents 512. A decrypting section 610 decrypts the encrypted contents 512 using the individual key 520, and generates encrypted contents 512a. A resident module 640 is equipped with a function of authenticating whether the control module 511 is a normal one or not. An individual key 630 has been allocated to the corresponding memory unit 600 in advance, for decrypting the encrypted contents 512a. A decrypting section 620 decrypts the encrypted contents 512a using the individual key 630, and generates decrypted contents 512b.

Figure 19:
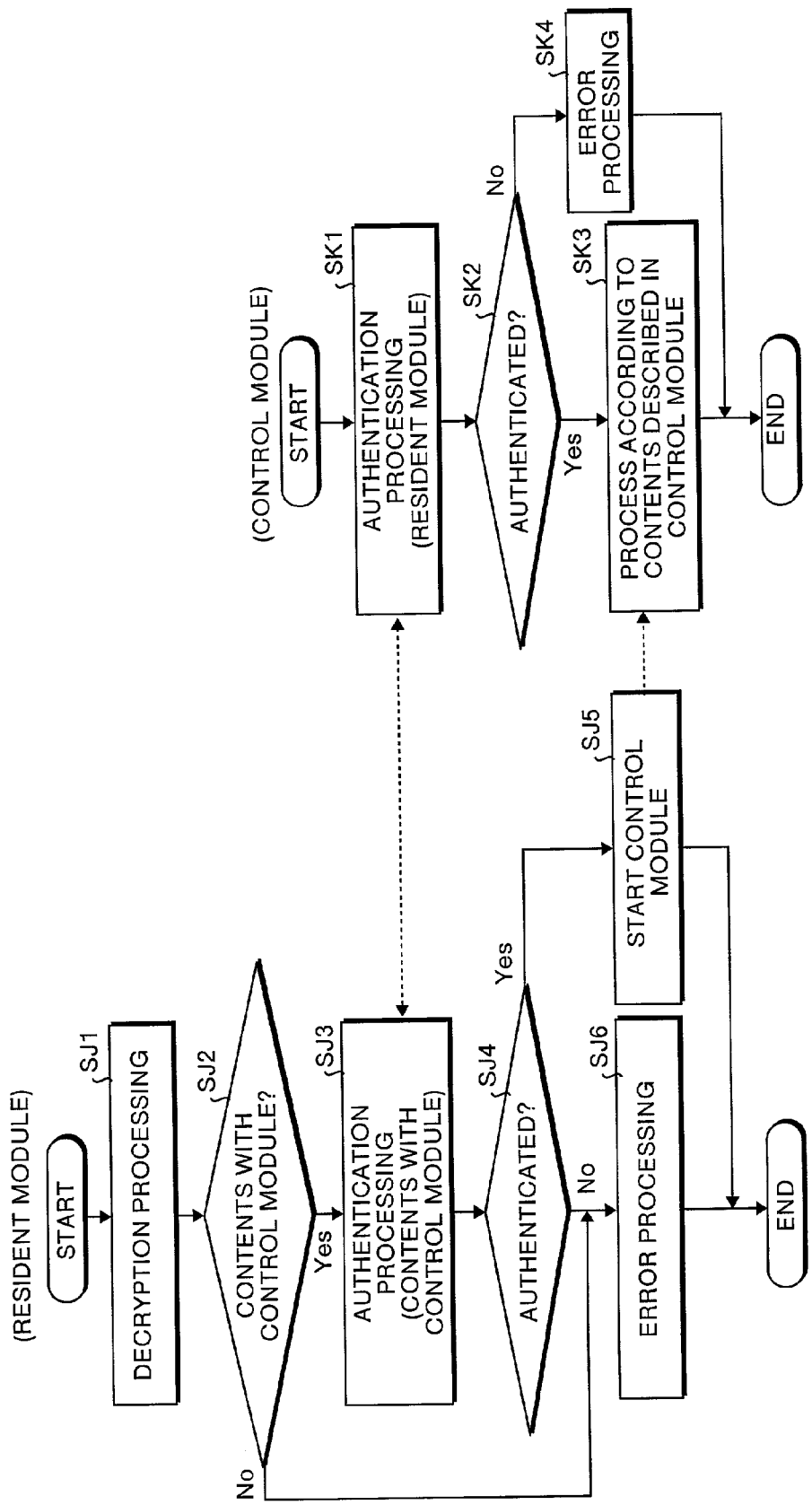
FIG. 19 is a flowchart for explaining the operation of the same embodiment.

Next, the operation of the construction example 3 shown in FIG. 8 will be explained with reference to a flowchart shown in FIG. 19. In FIG. 19, step SJ1 to step SJ6 express the operation of the resident module 640, and step SK1 to step SK4 express the operation of the control module 511. When the recording medium 500 has been set to the memory unit 600 shown in FIG. 8, the resident module 640 receives the individual key 520 from the control module 511, delivers the individual key 520 to the decrypting section 610, and then executes the decryption processing, at step SJ1. In other words, in the decryption processing, the decrypting section 610 decrypts the encrypted contents 512 using the individual key 520, and generates the encrypted contents 512a.

At step SJ2, the resident module 640 makes a decision as to whether the contents with control module 510 are the contents equipped with a control module or not. When a result of the decision made is "No", the resident module 640 executes an error processing at step SJ6. In this case, the resident module 640 sets "Yes" as a result of the decision made at step SJ2. At step SJ3, the resident module 640 executes an authentication processing between the resident module 640 and the control module 511. In parallel with this, at step SJ1, the control module 511 executes an authentication processing between the control module 511 and the resident module 640. In this authentication processing, a mutual authentication is carried out through the operation explained with reference to FIG. 12.

After finishing this authentication processing, at step SJ4, the resident module 640 makes a decision as to whether the authentication has been done in the affirmative or not. When a result of the decision made is "No", the resident module 640 executes an error processing at step SJ6. On the other hand, at step SK2, the control module 511 makes a decision as to whether the authentication has been done in the affirmative or not. When a result of the decision made is "No", the control module 511 executes an error processing at step SK4. In this case, it is assumed that the mutual authentication has been done in the affirmative. Then, the resident module 640 sets "Yes" as a result of the decision made at step SJ4, and the control module 511 sets "Yes" as a result of the decision made at step SK2.

At step SJ5, the resident module 640 starts the control module 511. At step SK3, the control module 511 executes the processing according to the contents of control described in itself. More specifically, the control module 511 delivers the individual key 630 to the decrypting section 620. Thus, the decrypting section 620 decrypts the encrypted contents 612a, and generates the decrypted contents 512b. The decrypted contents 512b are regenerated by a decoder not shown.

Figure 9:
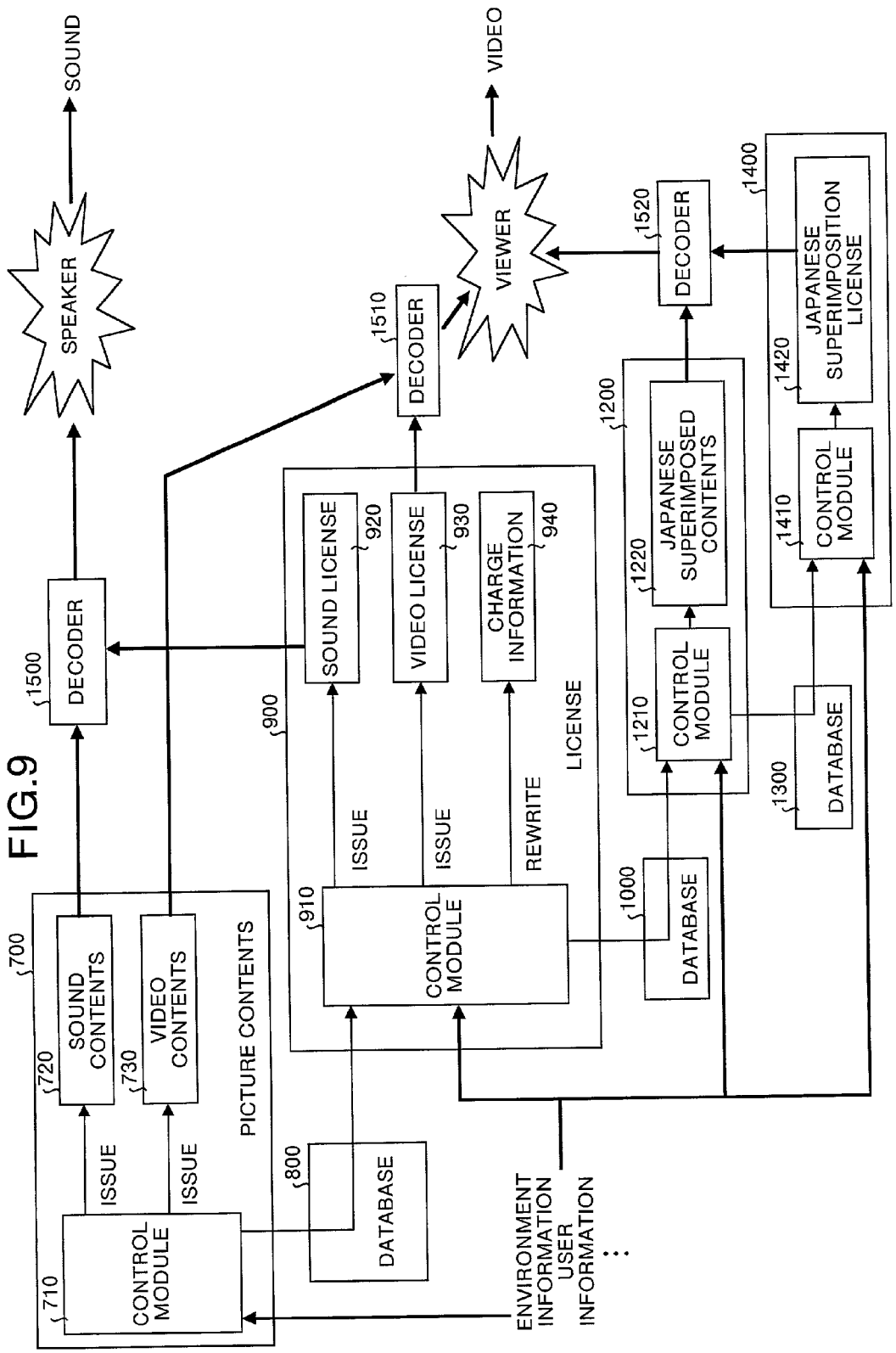
FIG. 9 is a block diagram showing a construction example 4 of the same embodiment.

Next, a construction example 4 of the embodiment 4 will be explained in detail. In FIG. 9, picture contents 700 consist of a control module 710, sound contents 720, and video contents 730. The control module 710 is equipped with a function of issuing the sound contents 720 and the video contents 730, and a function of searching a database 800. The sound contents 720 are the contents regarding a music that constitutes a picture, and the sound contents 720 are encrypted. The video contents 730 are the contents regarding a video that constitutes a picture, and the video contents 730 are encrypted.

The database 800 stores a plurality of licenses with control module. In the example shown in FIG. 9, the database 800 stores a license 900 as the license with control module. The license 900 is utilization approval information for approving the utilization of the picture contents 700. The license 900 consists of a control module 910, a sound license 920, a video license 930, and charge information 940. The control module 910 is equipped with a function of issuing the sound license 920 and the video license 930, a function of rewriting the charge information 940, and a function of searching a database 1000.

The sound license 920 is utilization approval information (a contents decryption key) for approving the utilization of the sound contents 720. The video license 930 is utilization approval information (a contents decryption key) for approving the utilization of the video contents 730. The charge information 940 is the charge information relating to the utilization of the sound contents 720, the video contents 730, and Japanese superimposed contents 1220 to be described later.

The database 1000 stores a plurality of licenses with control module. In the example shown in FIG. 9, the database 1000 stores contents with control module 1200. The contents with control module 1200 consist of a control module 1210 and the Japanese superimposed contents 1220, and provide information of a Japanese superimposition at the time of regenerating the video contents 700. The control module 1210 is equipped with a function of issuing the Japanese superimposed contents 1220, and a function of searching a database 1300. The Japanese superimposed contents 1220 are the information of a Japanese superimposition for a picture, and they are encrypted.

The database 1300 stores a plurality of licenses with control module. In the example shown in FIG. 9, the database 1300 stores a license with control module 1400. The license with control module 1400 consists of a control module 1410 and a Japanese superimposition license 1420, and this is utilization approval information for approving the utilization of the contents with control module 1200. The control module 1410 has a function of issuing the Japanese superimposition license 1420. The Japanese superimposition license 1420 is utilization approval information (a contents decryption key) for approving the utilization of the Japanese superimposed contents 1220.

A decoder 1500 decodes (decrypts) the sound contents 720 using the sound license 920. The decoded sound contents 720 are output as a sound of a picture through a speaker. A decoder 1510 decodes (decrypts) the video contents 730 using the video license 930. A decoder 1520 decodes (decrypts) the Japanese superimposed contents 1220 using the Japanese superimposition license 1420. Outputs of the decoder 1510 and the decoder 1520 are combined together by a viewer, and a picture including the Japanese superimposition is prepared.

Figure 14:
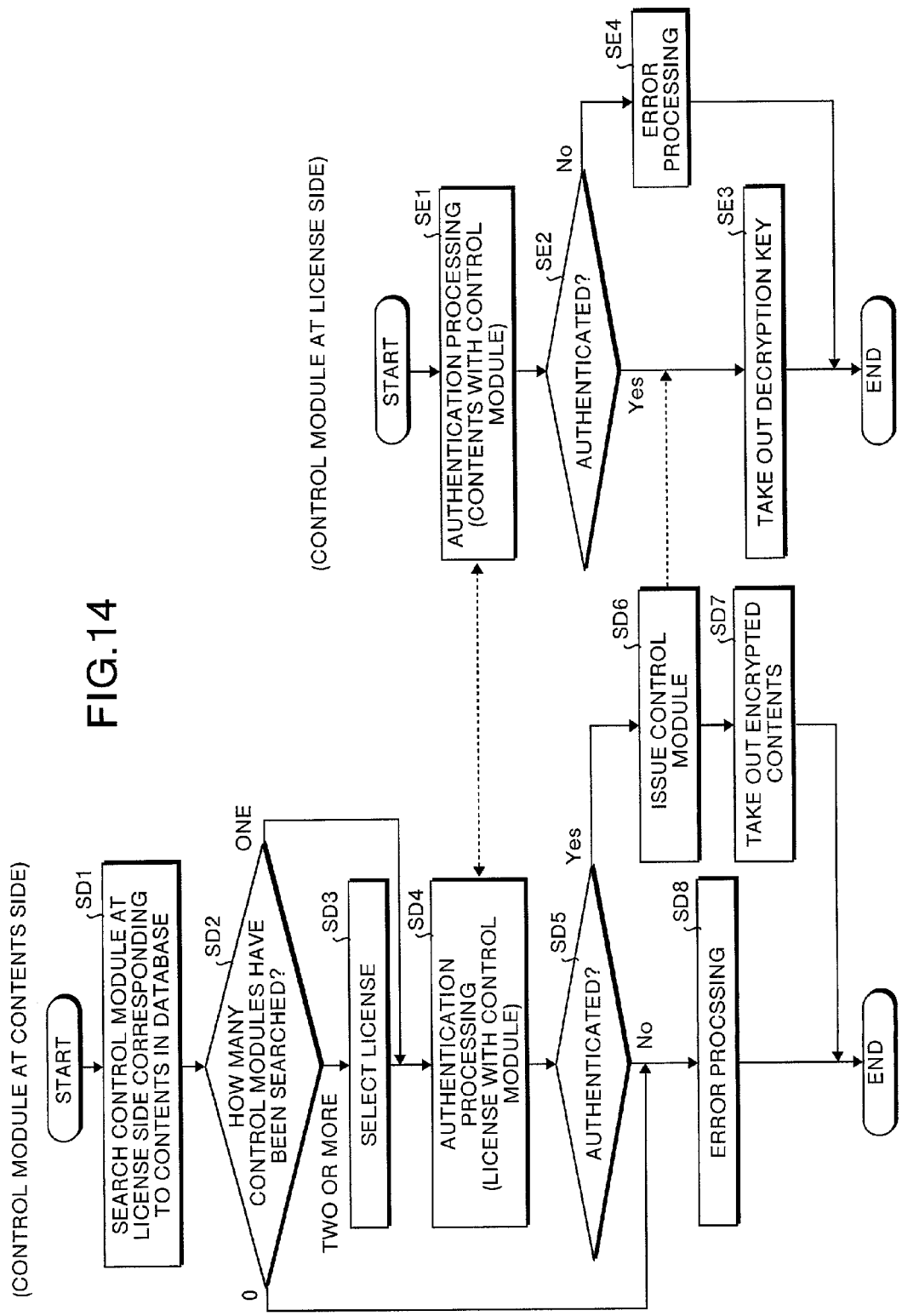
FIG. 14 is a flowchart for explaining the operation of the same embodiment.

Next, the operation of the construction example 4 shown in FIG. 9 will be explained with reference to a flowchart shown in FIG. 14. In FIG. 14, step SD1 to step SD8 express the operation of the control module 710 and the control module 1210 shown in FIG. 9, and step SE1 to step SE4 express the operation of the control module 910 and the control module 1410 shown in FIG. 9.

At step SD1 in FIG. 14, the control module 710 searches a control module at the license side corresponding to the picture contents 700, in the database 800. At step SD2, the control module 710 makes a decision about a search-hit number. When a search hit number is zero, the control module 710 executes an error processing at step SD8. When a search-hit number is two, the control module 710 selects any one of the two licenses (control modules), at step SD3.

In this case, it is assumed that the search-hit number is one, and the control module 910 (the license 900) has been hit. Therefore, at step SD4, the control module 710 executes an authentication processing between the control module 710 and the control module 910. In this authentication processing, a mutual authentication is carried out through the operation similar to that explained with reference to FIG. 12 in the above. At step SE1, the control module 910 also executes an authentication processing between the control module 910 and the control module 710.

After the authentication processing has been finished, at step SD5, the control module 710 makes a decision as to whether the authentication has been done in the affirmative or not. When a result of the decision made is "No", the control module 710 executes an error processing at step SD8. In the mean time, at step SE2, the control module 910 makes a decision as to whether the authentication has been done in the affirmative or not. When a result of the decision made is "No", the control module 910 executes an error processing at step SE4.

In this case, it is assumed that the mutual authentication has been done in the affirmative. Then, the control module 710 sets "Yes" as a result of the decision made at step SD5, and the control module 910 sets "Yes" as a result of the decision made at step SE2. At step SD6, the control module 710 starts the control module 910. Thus, at step SE3, the control module 910 takes out the sound license 920 and the video license 930 as decryption keys.

Figure 13:
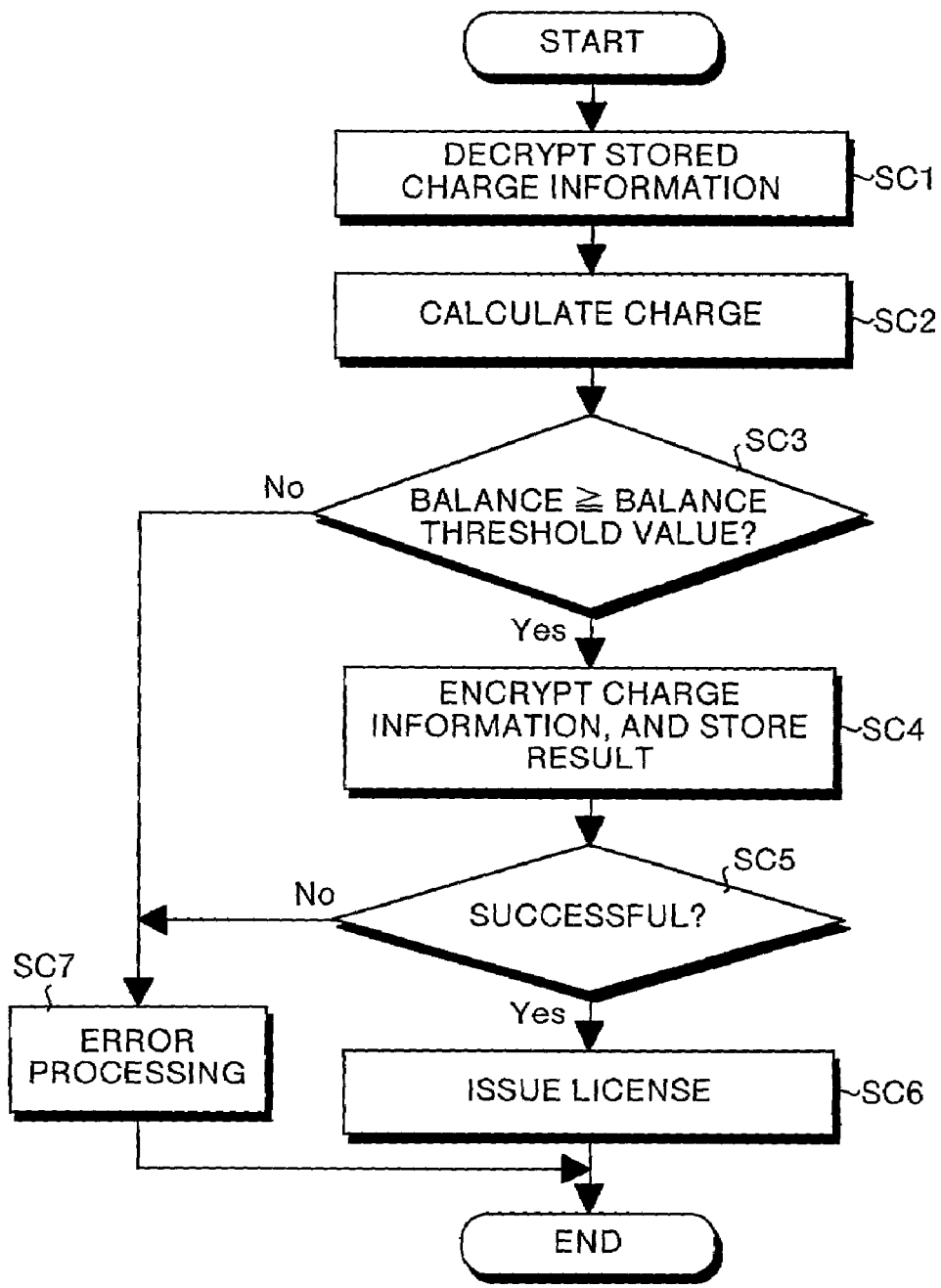
FIG. 13 is a flowchart for explaining the operation of the same embodiment.

Next, the control module 910 executes the processing of rewriting the charge information 940 according to the flowchart shown in FIG. 13. Specifically, at step SC1, the control module 910 decrypts the charge information 940. At step SC2, the control module 910 executes a charge calculation.

In other words, the control module 910 subtracts a utilization charge for one utilization of the contents relating to a picture (the sound contents 720, the video contents 730, etc.) from a balance obtained from the decrypted charge information 940, and sets the subtracted result as a new balance. At step SC3, the control module 910 makes a decision as to whether or not the above balance is a balance threshold value or above. When a result of the decision made is "No", the control module 910 executes an error processing at step SC7 by assuming that it is not possible to utilize the contents of the picture because of a shortage in the charge.

In this case, it is assumed that a result of the decision made at step SC3 is "Yes". Then, at step SC4, the control module 910 encrypts the charge information (the balance), and stores a result as the charge information 940. At step SC5, the control module 710 makes a decision as to whether the encrypted charge information has been stored successfully or not. When a result of the decision made is "No", the control module 710 executes an error processing at step SC7. In this case, it is assumed that a result of the decision made at step SC5 is "Yes". Then, the control module 910 issues the sound license 920 to the decoder 1500, and at the same time, issues the video license 930 to the decoder 1510.

In parallel with the above operation, at step SD7 shown in FIG. 14, the control module 710 takes out the encrypted sound contents 720 and the encrypted video contents 730, issues the sound contents 720 to the decoder 1500 and issues the video contents 730 to the decoder 1510. Thus, the decoder 1500 decodes the sound contents 720 using the sound license 920, and a speaker outputs the sound of the picture. At the same time, the decoder 1510 decodes the video contents 730 using the video license 930, and a video of the picture is output.

Figure 15:
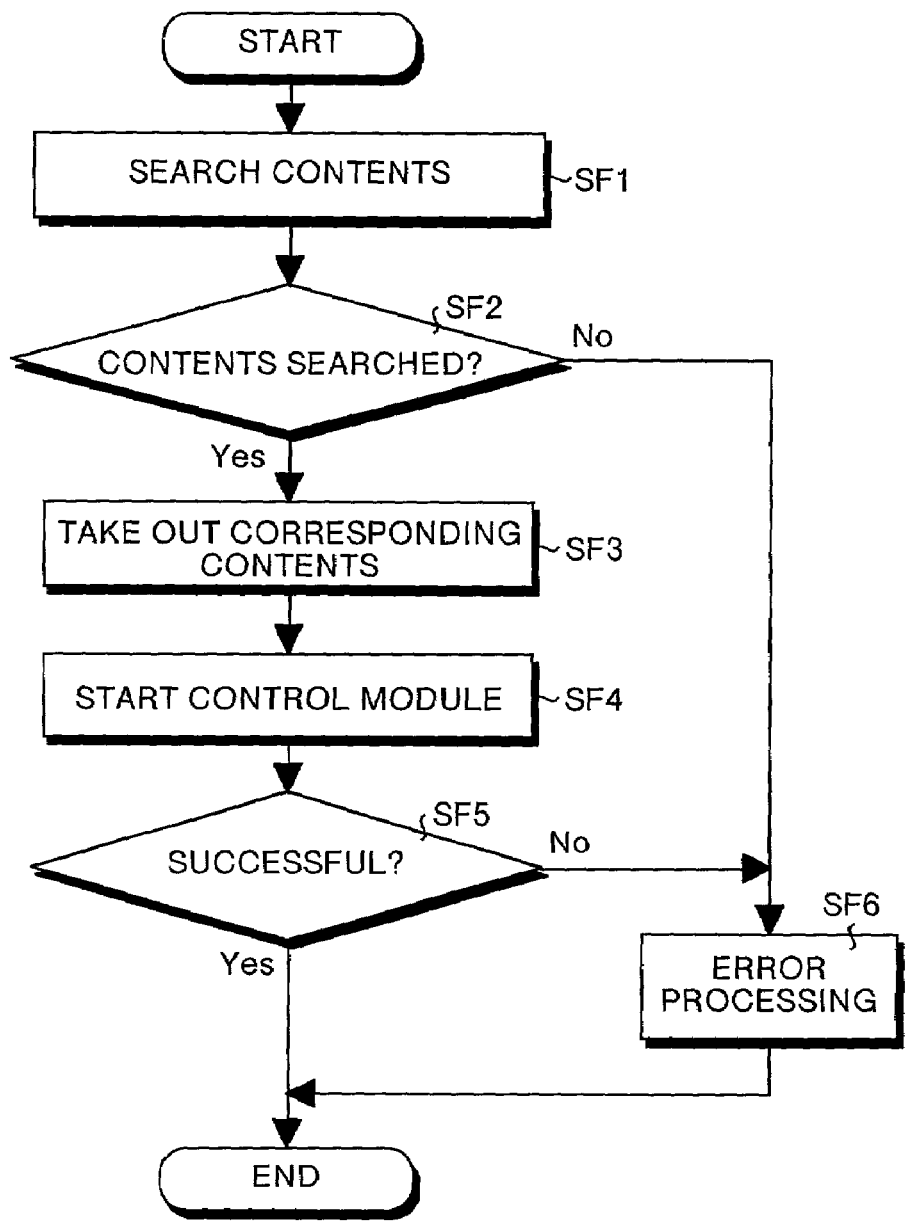
FIG. 15 is a flowchart for explaining the operation of the same embodiment.

Next, the control module 910 executes a search processing for searching contents with control module relating to the picture, in the database 1000, according to a flowchart shown in FIG. 15. At step SF1, the control module 910 searches contents with control module relating to the picture in the database 1000. At step SF2, the control module 910 makes a decision as to whether the search has been hit or not. When a result of the decision made is "No", the control module 910 executes an error processing at step SF6.

In this case, it is assumed that the search for contents with control module 1200 has been hit. Then, the control module 910 sets "Yes" as a result of the decision made at step SF2. At step SF3, the control module 910 retrieves the contents with control module 1200 from the database 1000. At step SF4, the control module 910 starts the control module 1210 of the contents with control module 1200. At step SF5, the control module 910 makes a decision as to whether the starting of the control module 1210 has been successful or not. When a result of the decision made is "Yes", the process ends normally. On the other hand, when a result of the decision made at step SF5 is "No", the control module 910 executes an error processing at step SF6.

Further, when the control module 1210 has been started, the control module 1210 starts the execution according to the flowchart shown in FIG. 14. At step SD1, the control module 1210 searches a control module at the license side corresponding to the contents with control module 1200, in the database 1300. At step SD2, the control module 1210 makes a decision about a search-hit number. When a search hit number is zero, the control module 1210 executes an error processing at step SD8. When a search-hit number is two, the control module 1210 selects any one of the two licenses (control modules), at step SD3.

In this case, it is assumed that a search-hit number is one, and the control module 1410 (the license with control module 1400) has been hit. Therefore, at step SD4, the control module 1210 executes an authentication processing between the control module 1210 and the control module 1410. In this authentication processing, a mutual authentication is carried out through the operation similar to that explained with reference to FIG. 12 in the above. At step SE1, the control module 1410 also executes an authentication processing between the control module 1410 and the control module 1210.

After the authentication processing has been finished, at step SD5, the control module 1210 makes a decision as to whether the authentication has been done in the affirmative or not. When a result of the decision made is "No", the control module 1210 executes an error processing at step SD8. In the mean time, at step SE2, the control module 1410 makes a decision as to whether the authentication has been done in the affirmative or not. When a result of the decision made is "No", the control module 1410 executes an error processing at step SE4. In this case, it is assumed that the mutual authentication has been done in the affirmative. Then, the control module 1210 sets "Yes" as a result of the decision made at step SD5, and the control module 1410 sets "Yes" as a result of the decision made at step SE2.

At step SD6, the control module 1210 starts the control module 1410. Thus, at step SE3, the control module 1410 takes out the Japanese superimposition license 1420 as a decryption key, and delivers the Japanese superimposition license 1420 to the decoder 1520. At step SD7, the control module 1210 takes out the Japanese superimposed contents 1220, and issues the Japanese superimposed contents 1220 to the decoder 1520. Thus, the decoder 1520 decodes the Japanese superimposed contents 1220 using the Japanese superimposition license 1420. As a result, the information about the Japanese superimposition of the picture is output.

Further, the above-described control module 910 is equipped with a function of deleting, adding and changing the contents (in this case, the contents with control module) in the database 1000. The delete processing, the add processing and the change processing will be explained below with reference to flowcharts shown in FIG. 16 to FIG. 18 respectively. In the delete processing, at step SG1 shown in FIG. 16, the control module 910 searches contents to be deleted from the database 1000. At step SG2, the control module 910 makes a decision as to whether the search has been hit or not. When a result of the decision made is "No", the control module 910 executes an error processing at step SG5.

When a result of the decision made at step SG2 is "Yes", the control module 910 deletes the corresponding contents from the database 1000 at step SG3. At step SG4, the control module 910 makes a decision as to whether the deletion has been successful or not. When a result of the decision made is "No", the control module 910 executes an error processing at step SG5. When a result of the decision made at step SG4 is "Yes", the control module 910 finishes the processing normally.

Figure 17:
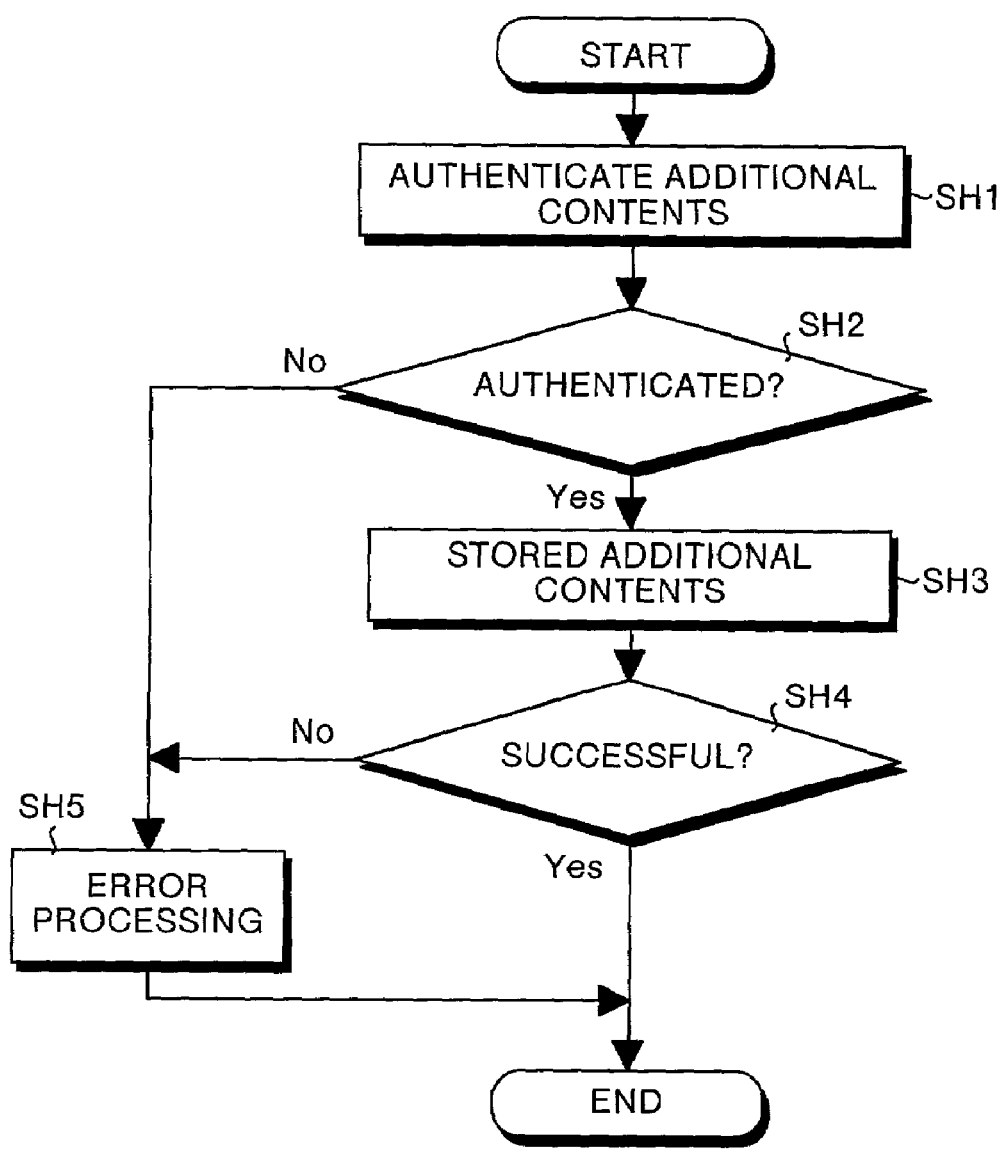
FIG. 17 is a flowchart for explaining the operation of the same embodiment.

Further, in the add processing, at step SH1 shown in FIG. 17, the control module 910 authenticates the contents (the contents with control module) to be added to the database 1000, according to the process explained with reference to FIG. 12. At step SH2, the control module 910 makes a decision as to whether the authentication has been done in the affirmative or not. When a result of the decision made is "No", the control module 910 executes an error processing at step SH5.

When a result of the decision made at step SH2 is "Yes", the control module 910 stores the contents (the contents with control module) in the database 1000 at step SH3. At step SH4, the control module 910 makes a decision as to whether the storing has been successful or not. When a result of the decision made is "No", the control module 910 executes an error processing at step SH5. When a result of the decision made at step SH4 is "Yes", the control module 910 finishes the processing normally.

Figure 18:
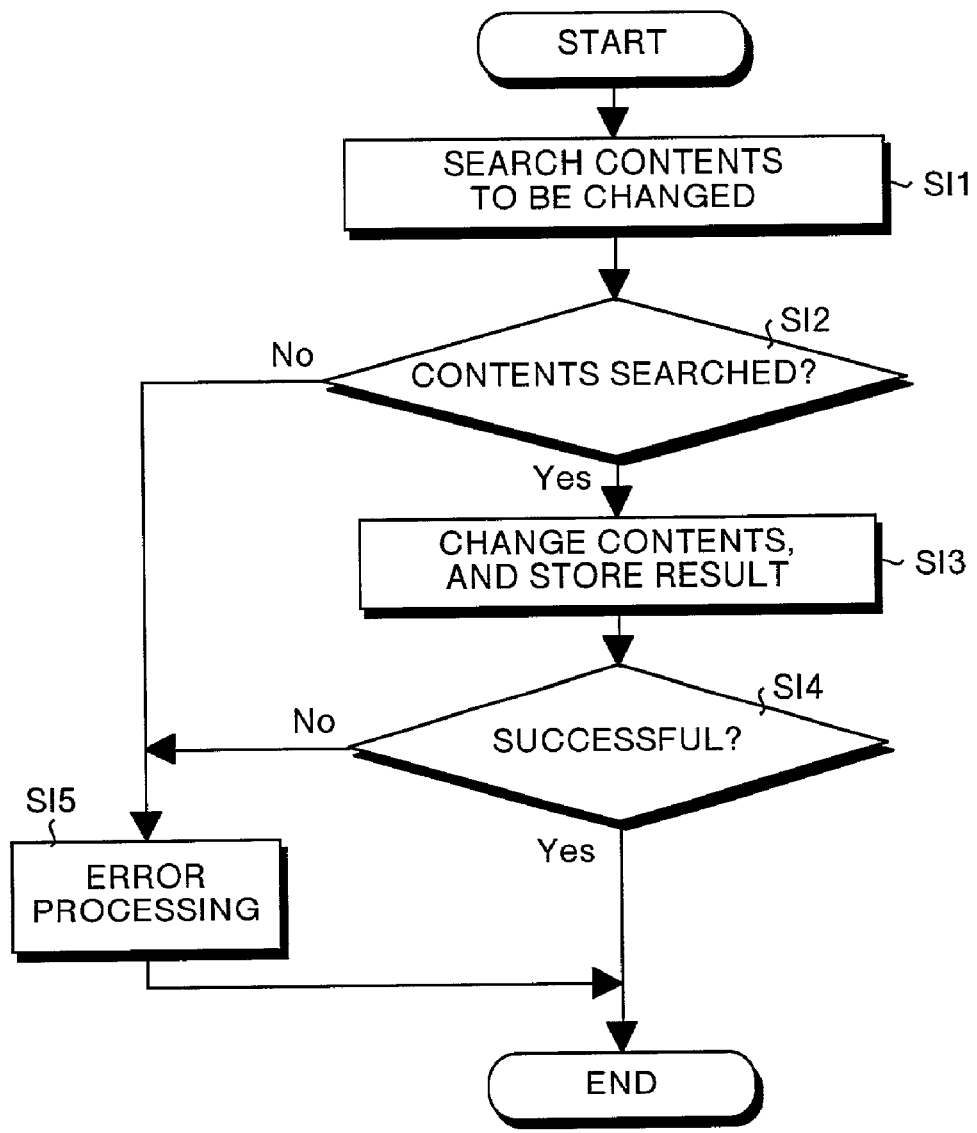
FIG. 18 is a flowchart for explaining the operation of the same embodiment.

In the change processing, at step SI1 shown in FIG. 18, the control module 910 searches contents (contents with control module) to be changed in the database 1000. At step SI2, the control module 910 makes a decision as to whether the search has been hit or not. When a result of the decision made is "No", the control module 910 executes an error processing at step SI5.

When a result of the decision made at step SI2 is "Yes", the control module 910 changes the corresponding contents (the contents with control module), and stores the changed contents in the database 1000 at step SI3. At step SI4, the control module 910 makes a decision as to whether the storing has been successful or not. When a result of the decision made is "No", the control module 910 executes an error processing at step SI5. When a result of the decision made at step SI4 is "Yes", the control module 910 finishes the processing normally. The above-described deletion processing, change processing and add processing can also be executed by the control module within the contents with control module and the above-described resident module respectively.

Figure 10:
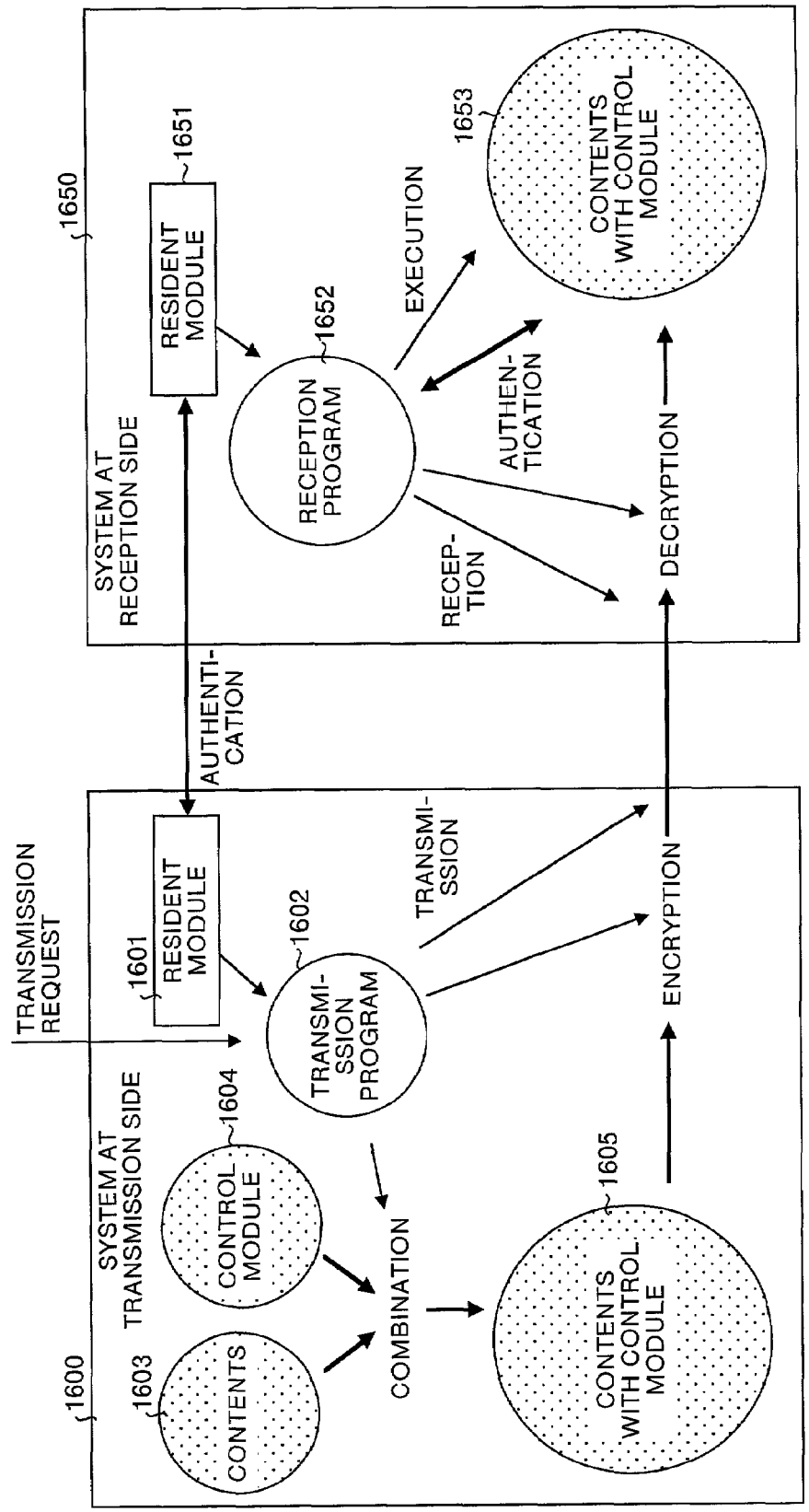
FIG. 10 is a block diagram showing a construction example 5 of the same embodiment.

Next, a construction example 5 of the embodiment will be explained in detail with reference to FIG. 10. In FIG. 10, a transmission side system 1600 is equipped with a function of combining contents 1603 with a control module 1604, and a function of transmitting contents with control module 1605, as a result of the combination, to a reception side system 1650. In the transmission side system 1600, a resident module 1601 is equipped with a function of authenticating a transmission program 1602 and a reception program 1652 as external programs, and a function of controlling the execution of the transmission program 1602.

A CPU not shown executes the transmission program 1602. The transmission program 1602 achieves a function of combining the contents 1603 with the control module 1604, a function of encrypting the combined contents with control module 1605 with a session key (refer to FIG. 12), and a function of transmitting the contents with control module 1605. The reception side system 1650 is equipped with a function of receiving the contents with control module 1605 from the transmission side system 1600, and a function of executing the processing based on the contents with control module 1605.

In the reception side system 1650, the resident module 1651 is equipped with a function of authenticating the resident module 1601, and a function of controlling the execution of the reception program 1652 as an external program. A CPU not shown executes the reception program 1652. The reception program 1652 is equipped with a function of receiving the contents with control module 1605, a function of decrypting the contents with control module 1605 with a session key (refer to FIG. 12) a function of authenticating contents with control module 1653, and a function of executing the processing based on the contents with control module 1653.

In the construction example 5, various functions are realized when the CPU executes the transmission program 1602 and the reception program 1652. In order to simplify the explanation, in the following description, it is assumed that the transmission program 1602 and the reception program 1652 realize the various functions.

Figure 20:
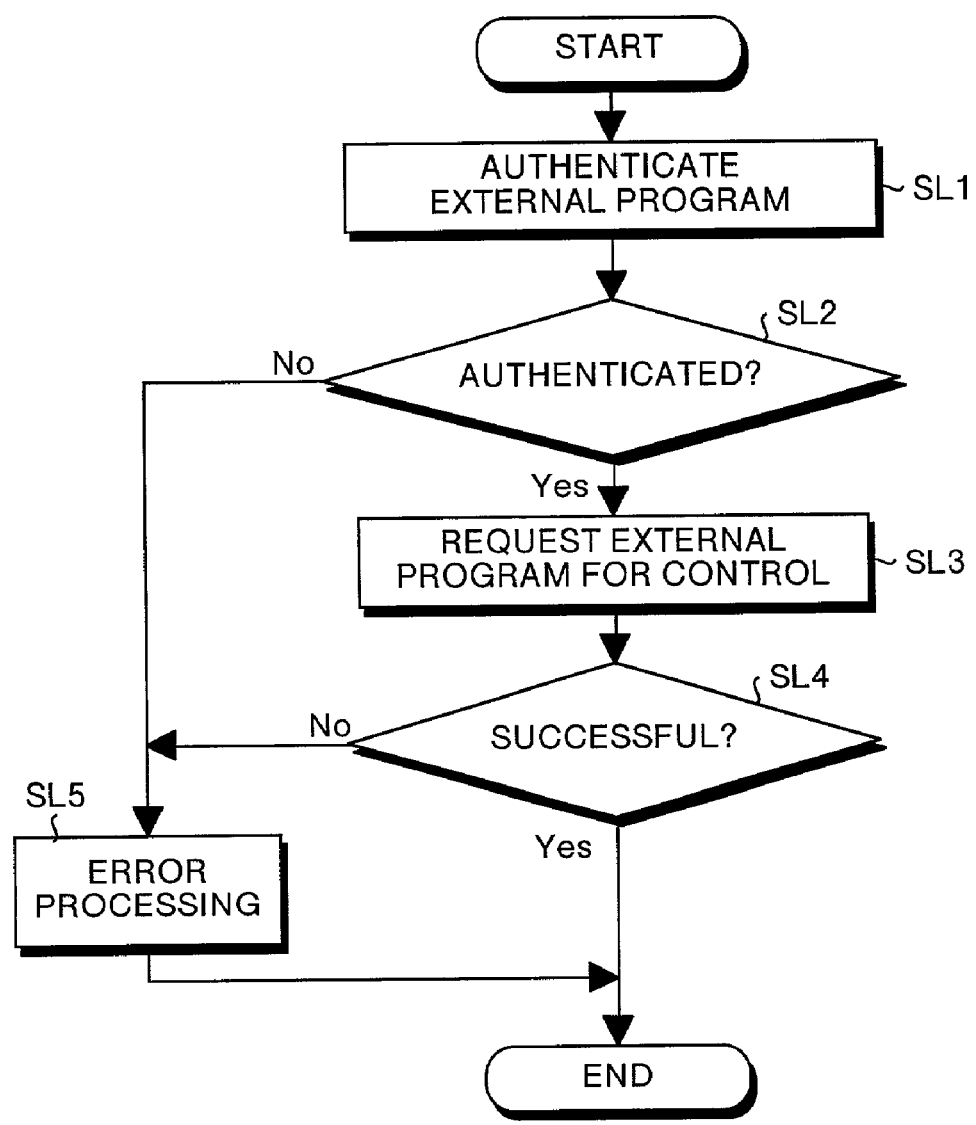
FIG. 20 is a flowchart for explaining the operation of the same embodiment.

The operation of the construction example 5 shown in FIG. 10 will be explained next with reference to a flowchart shown in FIG. 20. In FIG. 20, step SL1 to step SL5 express the operation of the resident module 1601 and the resident module 1651 respectively. First, the resident module 1601 and the resident module 1651 execute the authentication processing explained with reference to FIG. 12. In this case, a module $M_A$ corresponds to the resident module 1601, and a module $M_B$ corresponds to the resident module 1651.

When a mutual authentication between the resident module 1601 and the resident module 1651 has been normally finished, at step SL1 shown in FIG. 20, the resident module 1601 executes the authentication processing explained in FIG. 12 between the resident module 1601 and the transmission program 1602. In this case, the module $M_A$ shown in FIG. 12 corresponds to the resident module 1601, and a module $M_B$ corresponds to the transmission program 1602. At step SL2, the resident module 1601 makes a decision as to whether the authentication has been done in the affirmative or not. When a result of the decision made is "No", the resident module 1601 executes an error processing at step SL5.

In this case, it is assumed that a result of the decision made at step SL2 is "Yes". Then, at step SL3, the resident module 1601 requests the transmission program 1602 as an external program to carry out the control. Specifically, the resident module 1601 issues a transmission request to the transmission program 1602. At step SL4, the resident module 1601 makes a decision as to whether or not the transmission request has been normally received by the transmission program 1602. When a result of the decision made is "No", the resident module 1601 executes an error processing at step SL5. In this case, it is assumed that a result of the decision made at step SL4 is "Yes", and the resident module 1601 normally finishes the processing.

When a transmission request has been issued from the resident module 1601, the transmission program 1602 combines the contents 1603 with the control module 1604, and generates the contents with control module 1605. Then, the transmission program 1602 encrypts the contents with control module 1605 with a session key (refer to FIG. 12), and transmits the encrypted contents with control module 1605 to the reception side system 1650.

In the meantime, at step SL1 shown in FIG. 20, the resident module 1651 executes the authentication processing explained in FIG. 12 between the resident module 1651 and the reception program 1652. In this case, the module $M_A$ shown in FIG. 12 corresponds to the resident module 1651, and the module $M_B$ corresponds to the transmission program 1652. At step SL2, the resident module 1651 makes a decision as to whether the authentication has been done in the affirmative or not. When a result of the decision made is "No", the resident module 1651 executes an error processing at step SL5.

In this case, it is assumed that a result of the decision made at step SL2 is "Yes". Then, at step SL3, the resident module 1651 requests the reception program 1652 as an external program to carry out the control. Specifically, the resident module 1651 issues a reception request to the reception program 1652. At step SL4, the resident module 1651 makes a decision as to whether or not the reception request has been normally received by the reception program 1652. When a result of the decision made is "No", the resident module 1651 executes an error processing at step SL5. In this case, it is assumed that a result of the decision made at step SL4 is "Yes", and the resident module 1651 normally finishes the processing.

When a reception request has been issued from the resident module 1651, the reception program 1652 receives the encrypted contents with control module 1605, and the decrypts the encrypted contents with control module 1605 with the session key (refer to FIG. 12). Next, the reception program 1652 executes the authentication processing explained in FIG. 12 between the reception program 1652 and the control module 1604 within the decrypted contents with control module 1653. In this case, the module $M_A$ shown in FIG. 12 corresponds to the reception program 1652, and the module $M_B$ corresponds to the control module 1604. When the authentication processing has been normally finished, the reception program 1652 starts the control module 1604 within the contents with control module 1653 so as to execute a processing similar to that of the above-described various control modules.

Figure 11:
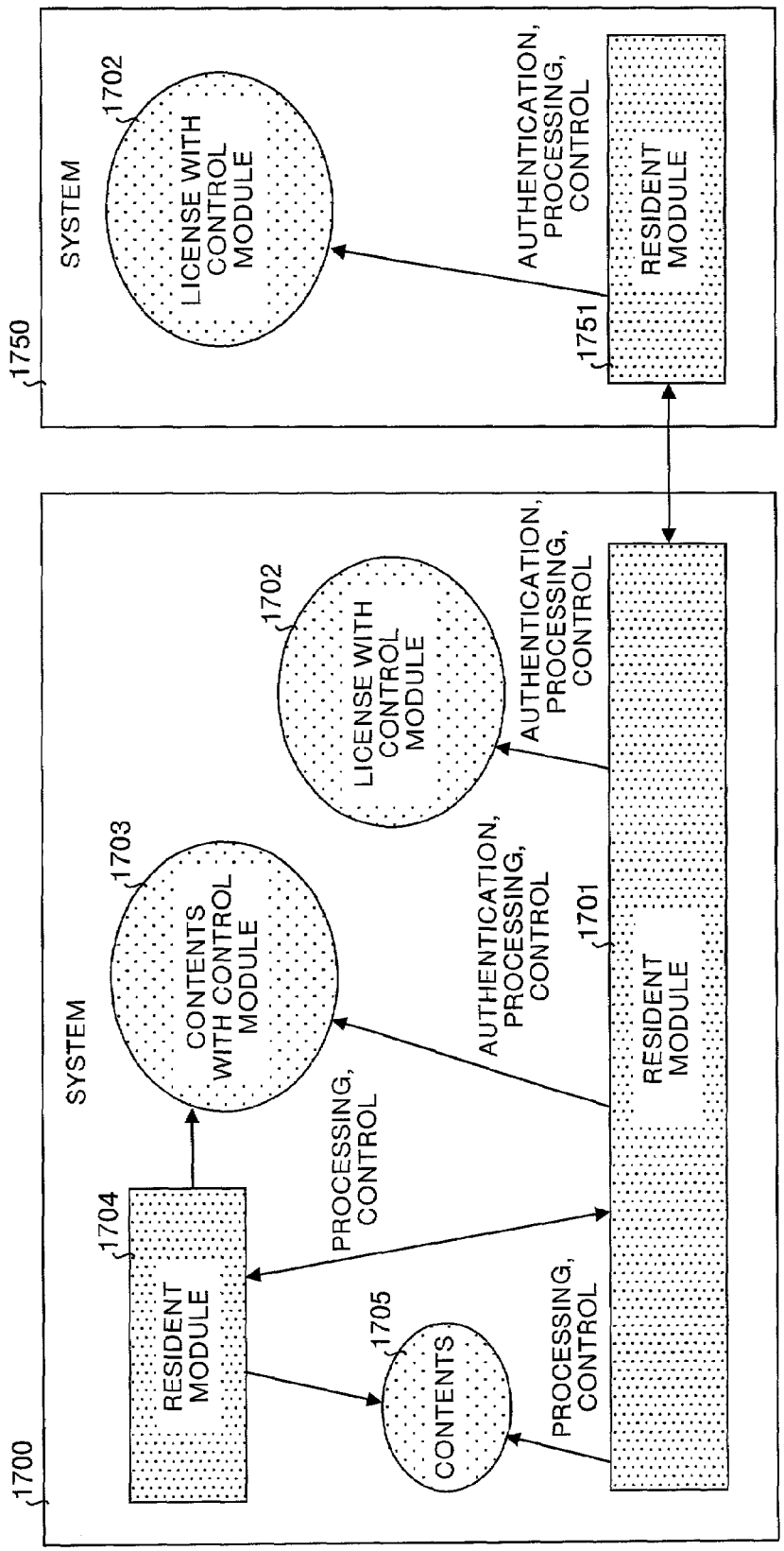
FIG. 11 is a block diagram showing a construction example 6 of the same embodiment.

Next, a construction example 6 of the embodiment will be explained in detail with reference to FIG. 11. In FIG. 11, a system 1700 is equipped with a function of authenticating, controlling and processing respectively contents 1705, contents with control module 1703, and a license with control module 1702, and a function of transmitting the contents with control module 1703 to a system 1750. The license with control module 1702 is utilization approval information for approving the utilization of the contents with control module 1703. The license with control module 1702 consists of a control module and a license in a similar manner to that of the license with control module 20 shown in FIG. 1B.

The contents with control module 1703 consist of a control module and contents in a similar manner to that of the license with control module 10 shown in FIG. 1A. The resident module 1701 is equipped with a function of authenticating, processing and controlling respectively the license with control module 1702 and the contents with control module 1703, and a function of transmitting the contents with control module 1703 to the system 1750.

Further, the resident module 1701 is also equipped with a function of authenticating and controlling the resident module 1704, and a function of processing and controlling the contents 1705. The resident module 1704 is equipped with a function of authenticating and controlling the resident module 1701, and a function of controlling the contents with control module 1703 and the contents 1705.

On the other hand, in the system 1750, the resident module 1751 is equipped with a function of authenticating, processing and controlling the license with control module 1702, a function of authenticating the resident module 1701, and a function of receiving the contents with control module 1703 from the system 1700. In this case, the license with control module 1702 within the system 1700 and the license with control module 1702 within the system 1750 a re both utilization approval information for approving the utilization of the contents with control module 1703 respectively.

Figure 21:
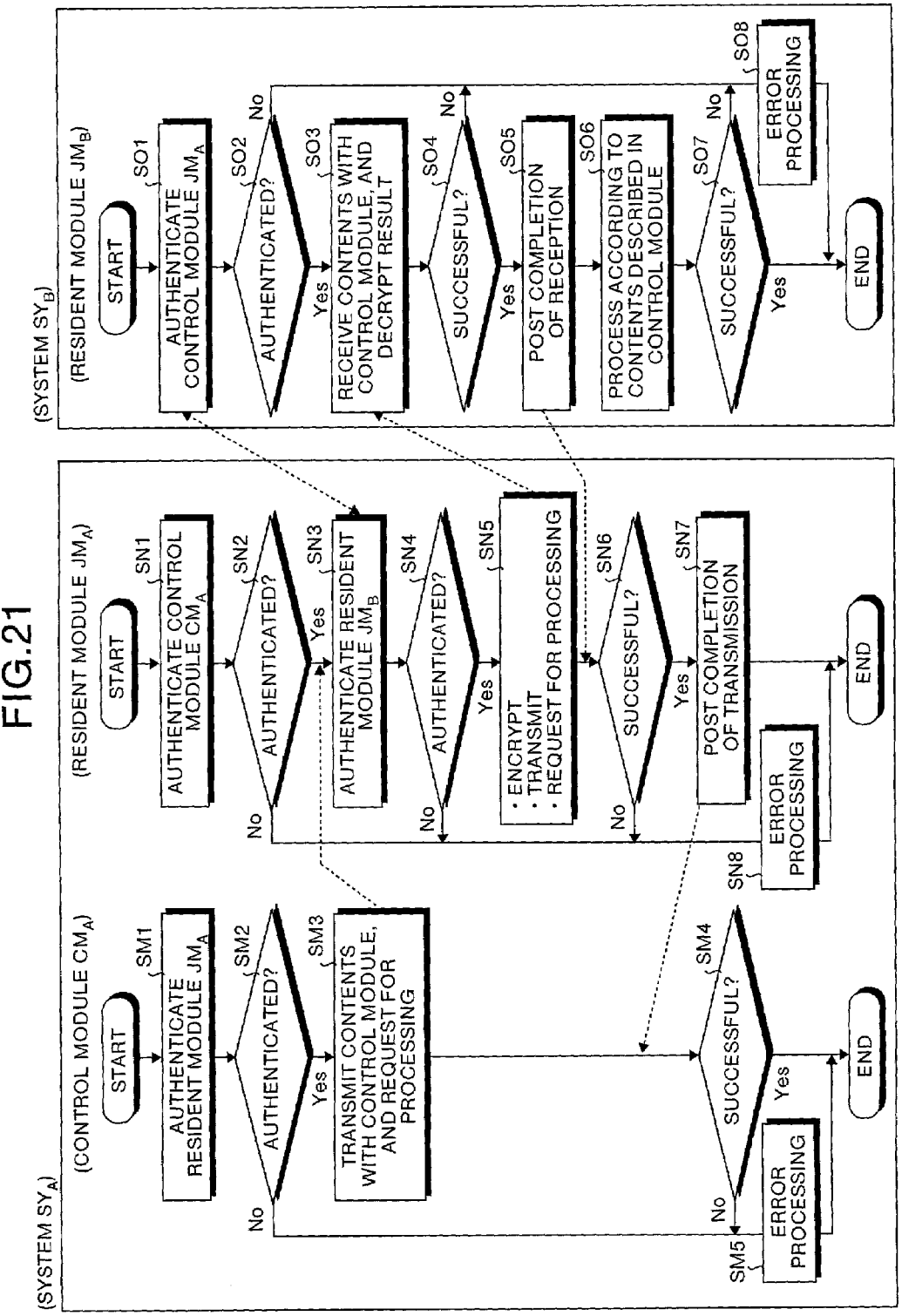
FIG. 21 is a flowchart for explaining the operation of the same embodiment.

Next, the operation of the construction example 6 shown in FIG. 11 will be explained with reference to a flowchart shown in FIG. 21. In FIG. 21, a system $SY_A$, a control module $CM_A$, a resident module $JM_A$, a system $SY_B$, and a resident module $JM_B$ correspond to the system 1700, the control module (not shown) within the contents with control module 1703, the resident module 1701, the system 1750, and the resident module 1751 shown in FIG. 11, respectively.

At step SM1, the control module within the contents with control module 1703 executes the authentication processing explained in FIG. 12 between this control module and the resident module 1701. At the same time, at step SN1, the resident module 1701 executes the authentication processing explained in FIG. 12 between the resident module 1701 and the control module within the contents with control module 1703. In this case, a module $M_A$ shown in FIG. 12 corresponds to the control module within the contents with control module 1703, and a module $M_B$ shown in FIG. 12 corresponds to the resident module 1701.

When a mutual authentication between the control module within the contents with control module 1703 and the resident module 1701 has been normally finished, at step SM2, the control module within the contents with control module 1703 makes a decision as to whether the authentication has been done in the affirmative or not. When a result of the decision made is "No", the control module within the contents with control module 1703 executes an error processing at step SM5. At the same time, at step SN2, the resident module 1701 makes a decision as to whether the authentication has been done in the affirmative or not. When a result of the decision made is "No", the resident module 1701 executes an error processing at step SN8.

In this case, it is assumed that a result of the decision made at step SM2 and a result of the decision made at step SN2 are both "Yes". Then, at step SM3, the control module within the contents with control module 1703 requests the resident module 1701 to carry out the processing of transmitting the license with control module 1703 to the system 1750. At step SM4, the control module within the contents with control module 1703 makes a decision as to whether or not the transmission request has been normally received by the resident module 1701. When a result of the decision made is "No", the control module within the contents with control module 1703 executes an error processing at step SM5. In this case, it is assumed that a result of the decision made at step SM4 is "Yes", and the control module within the contents with control module 1703 normally finishes the processing.

When the resident module 1701 has received the request from the control module within the contents with control module 1703 (step SM3), the resident module 1701 executes the authentication processing explained in FIG. 12 between the resident module 1701 and the resident module 1751 of the system 1750, at step SN3. At the same time, at step SO1, the resident module 1751 executes the authentication processing explained in FIG. 12 between the resident module 1751 and the resident module 1701. In this case, the module $M_A$ shown in FIG. 12 corresponds to the resident module 1701, and the module $M_B$ shown in FIG. 12 corresponds to the resident module 1751.

When a mutual authentication between the resident module 1701 and the resident module 1751 has been normally finished, at step SN4, the resident module 1701 makes a decision as to whether the authentication has been done in the affirmative or not. When a result of the decision made is "No", the resident module 1701 executes an error processing at step SN8. At the same time, at step SO2, the resident module 1751 makes a decision as to whether the authentication has been done in the affirmative or not. When a result of the decision made is "No", the resident module 1751 executes an error processing at step SO8.

In this case, it is assumed that a result of the decision made at step SN4 and a result of the decision made at step SO2 are both "Yes". Then, at step SN5, the resident module 1701 encrypts the contents with control module 1703 with a session key (refer to FIG. 12), and transmits the encrypted contents with control module 1703 to the system 1750. At the same time, the resident module 1701 issues a request to the system 1750 to execute the processing according to the control module within the contents with control module 1703.

At step SN6, the resident module 1701 makes a decision as to whether or not a series of processing at step SN5 have been carried out normally or not. When a result of the decision made is "No", the resident module 1701 executes an error processing at step SN8. In this case, it is assumed that a result of the decision made at step SN6 is "Yes". Then, at step SN7, the resident module 1701 posts a notice of a completion of the transmission, to the control module within the contents with control module 1703, and normally finishes the processing.

In the mean time, at step SO3, after the resident module 1751 has received the encoded contents with control module 1703, the resident module 1751 decrypts the contents with a recession key (refer to FIG. 12). At step SO4, the resident module 1751 makes a decision as to whether or not the processing at step SO3 has been carried out normally or not. When a result of the decision made is "No", the resident module 1751 executes an error processing at step SO8. In this case, it is assumed that a result of the decision made at step SO4 is "Yes". Then, at step SO5, the resident module 1751 posts a notice of a completion of the reception, to the resident module 1701.

At step SO6, the resident module 1751 carries out an authentication processing among the resident module 1751, the control module (not shown) of the received contents with control module 1703, and the control module of the license with control module 1702. The resident module 1751 then executes a series of processing of the utilization of the contents, in a similar manner to that of the above-described operation. At step SO7, the resident module 1751 makes a decision as to whether the series of processing have been carried out normally or not. When a result of the decision made is "No", the resident module 1751 executes an error processing at step SO8. In this case, it is assumed that a result of the decision made at step SO7 is "Yes". Then, the resident module 1751 normally finishes the processing.

As explained above, according to the present embodiment, the control relating to the utilization of the contents is carried out based on the cooperation between the control module at the side of the contents with control module and the control module at the side of the license with control module. Therefore, it is possible to carry out a flexible utilization of the contents, without depending on the environment of the apparatus that utilizes the contents like the conventional practice.

Further, according to the present embodiment, the authentication is carried out among the control module at the side of the contents with control module, the resident module, and the control module at the side of the license with control module. The control relating to the utilization of the contents is carried out based on a result of this authentication. Therefore, it is possible to increase the level of security, and it is also possible to prevent unfair utilization of the contents.

Further, according to the present embodiment, as shown in FIG. 10, the contents 1603 and the control module 1604 are combined together to generate the contents with control module 1605, and the contents with control module 1605 are transmitted to the reception side system 1650. Therefore, the system 1650 at the reception side can carry out a flexible utilization of the contents without depending on the environment of the apparatus.

Further, according to the present embodiment, the contents with control module 1605 are transmitted based on a result of the authentication carried out between the resident module 1601 and the resident module 1651. Therefore, it is possible to increase the level of security, and it is also possible to prevent an intentional erroneous transmission of the contents to a third party.

Further, according to the present embodiment, as shown in FIG. 9, the control modules 710, 910 and 1210 respectively have a search function of searching a license with control module and contents with control module that have high relationship in the databases 800, 1000 and 1300 respectively. Then, the control regarding the utilization of the contents is carried out based on the cooperation of the searched information. Therefore, it is possible to easily utilize a plurality of kinds of contents without requiring a complex control at the apparatus side.

Figure 16:
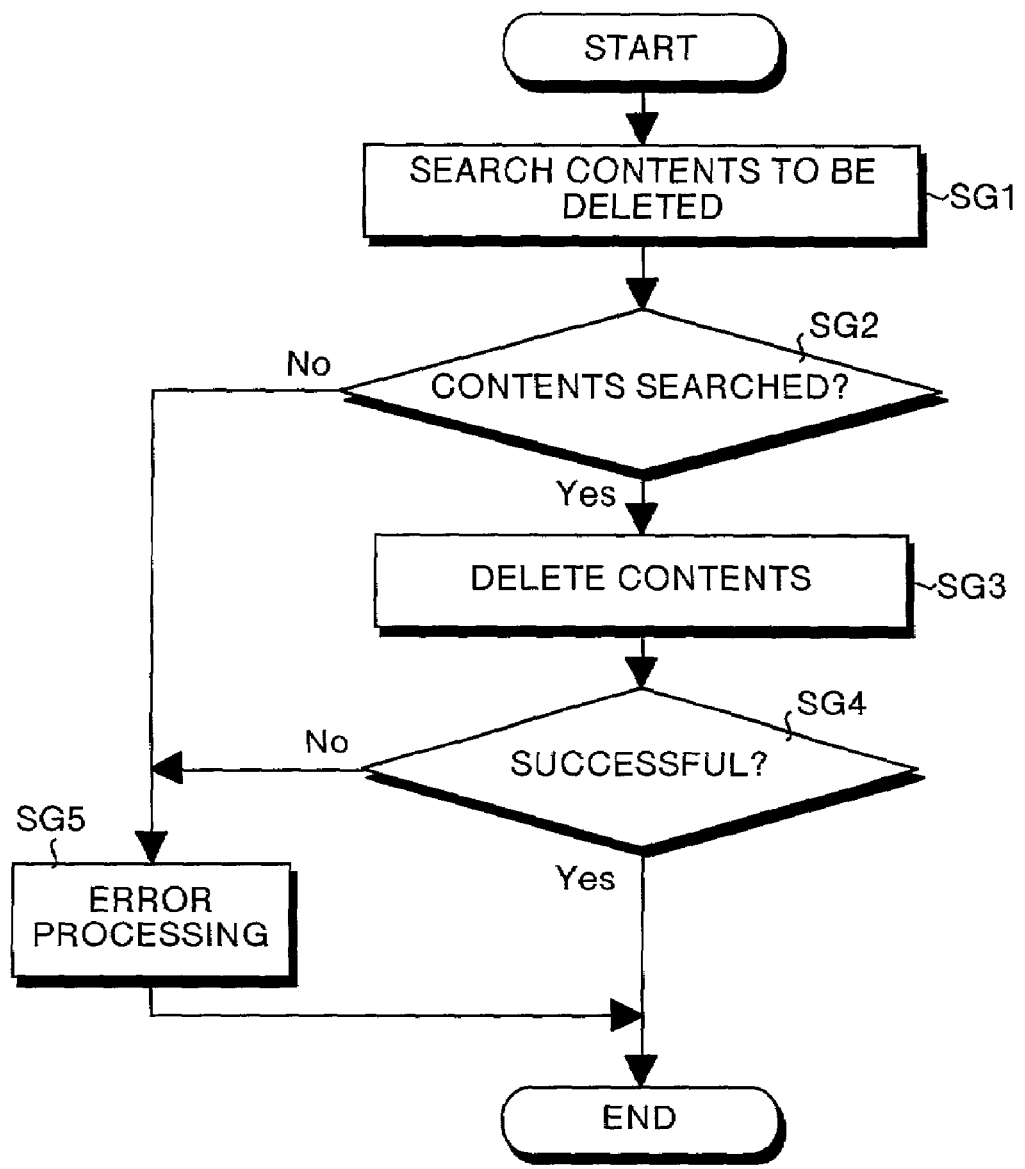
FIG. 16 is a flowchart for explaining the operation of the same embodiment.

Further, according to the present embodiment, as explained with reference to FIG. 16 to FIG. 18, the control module 910 carries out an updating of the database 1000. Therefore, it is possible to reduce the load of the apparatus regarding the management of the database.

Further, according to the present embodiment, as explained with reference to FIG. 3A and FIG. 3B, a plurality of kinds of control regarding the utilization of the contents are carried out corresponding to a combination among the first control module $51_1$ to the third control module $51_3$ and the first control module $61_1$ to the third control module $61_3$. Therefore, it is possible to carry out a flexible utilization of the contents, without depending on the environment of the apparatus that utilizes the contents like the conventional practice.

Further, according to the present embodiment, as explained with reference to FIG. 13, the control module 910 updates the charge information 940 for the utilization of the contents. Therefore, it is possible to reduce the load on the management of the provision of the contents, as compared with the case of managing the charge by the contents provision right owner like the conventional practice.

Further, according to the present embodiment, as explained with reference to FIG. 4A and FIG. 4B, the control relating to the utilization of the contents is carried out in hierarchy by using the contents collection/license collection with control module 70. Therefore, it is possible to efficiently utilize a plurality of kinds of contents.

One embodiment relating to the present invention has been explained above with reference to the drawings. Detailed construction examples are not limited to those explained in the above embodiment, and any other design alterations within the range not deviating from the gist of the present invention are all included in the present invention. Modified examples 1 to 8 of the embodiment will be explained next with reference to FIG. 22 to FIG. 26.

Figure 22:
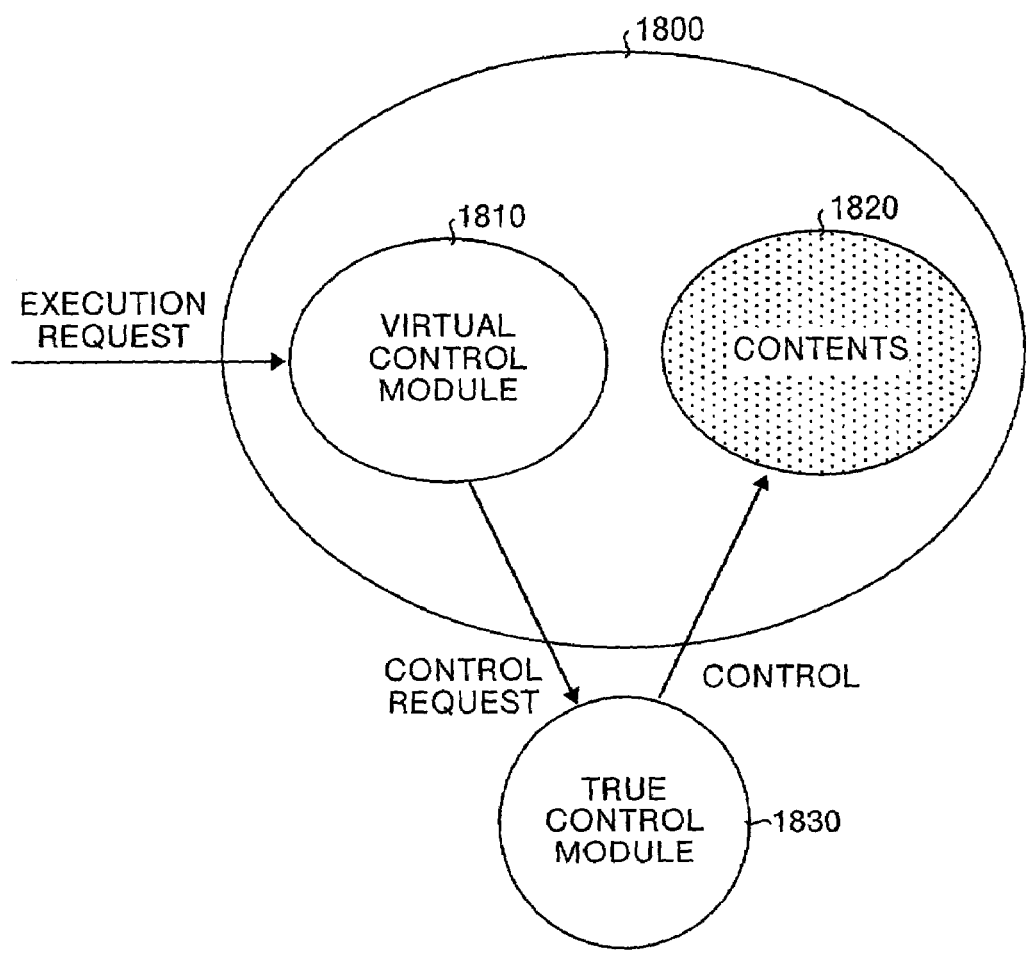
FIG. 22 is a diagram for explaining a modified example 1 of the same embodiment.

In the above embodiment, the example of controlling the contents 12 by the control module 11 shown in FIG. 1A has been explained. However, it is also possible to control the contents by an external control module. This case will be explained as a modified example 1 of the embodiment. FIG. 22 is a diagram for explaining the modified example 1 of the embodiment. In FIG. 22, contents with virtual control module 1800 consist of a virtual control module 1810 and contents 1820.

When a request for the execution has been received from the outside, the virtual control module 1810 issues a control request to a true control module 1830 located at the outside. Therefore, the virtual control module 1810 cannot directly control the contents 1820. The true control module 1830 correspond to the control module 11 shown in FIG. 1A, and this true control module 1830 executes a control similar to that of the control module 11 according to the control request from the virtual control module 1810.

Figure 23A:
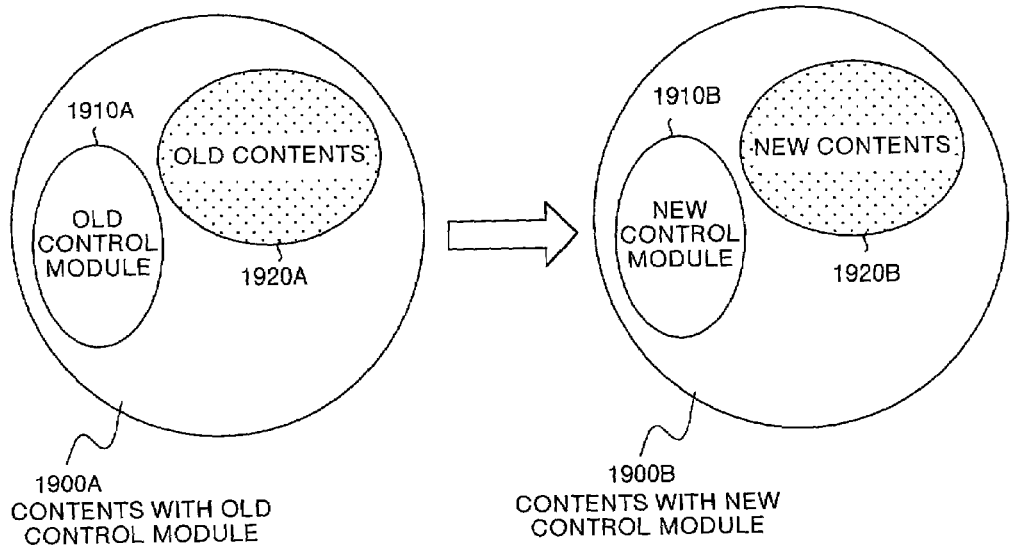
FIG. 23A and FIG. 23B are diagrams for explaining modified examples 2 and 3 of the same embodiment.

In the embodiment, a CPU, a control module, a resident module, etc. (hereinafter to be simply referred to as a CPU and the like) may update the control module 11 and the contents 12 within the contents with control module 10 shown in FIG. 1A into a new control module and new contents respectively. This case will be explained next as a modified example 2 of the embodiment. FIG. 23A is a diagram for explaining the modified example 2 of the embodiment.

In FIG. 23A, contents with old control module 1900A are the contents before the updating, and the contents with old control module 1900A consist of an old control module 1910A and old contents 1920A. When the CPU and the like carry out the update processing in this state, the contents with old control module 1900A are updated into contents with new control module 1900B. The contents with new control module 1900B consist of a new control module 1910B after the updating (corresponding to the old control module 1910A), and new contents 1920B after the updating (corresponding to the old contents 1920A).

Figure 23B:
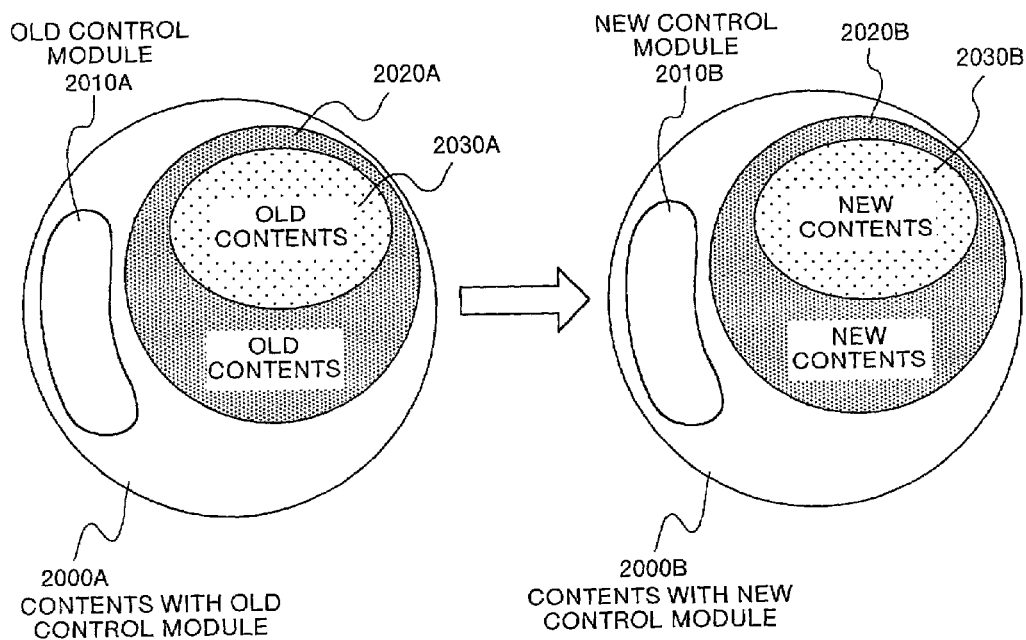

In the modified example 2 of the embodiment shown in FIG. 23A, the example of updating all of the control module and contents has been explained. However, it is also possible to update a part of the contents. This case will be explained next as a modified example 3 of the embodiment. FIG. 23B is a diagram for explaining the modified example 3 of the embodiment.

In FIG. 23B, contents with old control module 2000A are the contents before the updating, and the contents with old control module 2000A consist of an old control module 2010A and old contents 2020A. The old contents 2020A include old contents 2030A that can be changed. When the CPU and the like carry out the update processing of the control module 2010A and the old part contents 2030A in this state, the contents with old control module 2000A are updated into contents with new control module 2000B.

The contents with new control module 2000B consist of a new control module 2010B after the updating (corresponding to the old control module 2010A), and new contents 2020B after the updating (corresponding to the old contents 2020A). The updated portion in the new contents 2020B is new part contents 2030B.

Figure 24A:
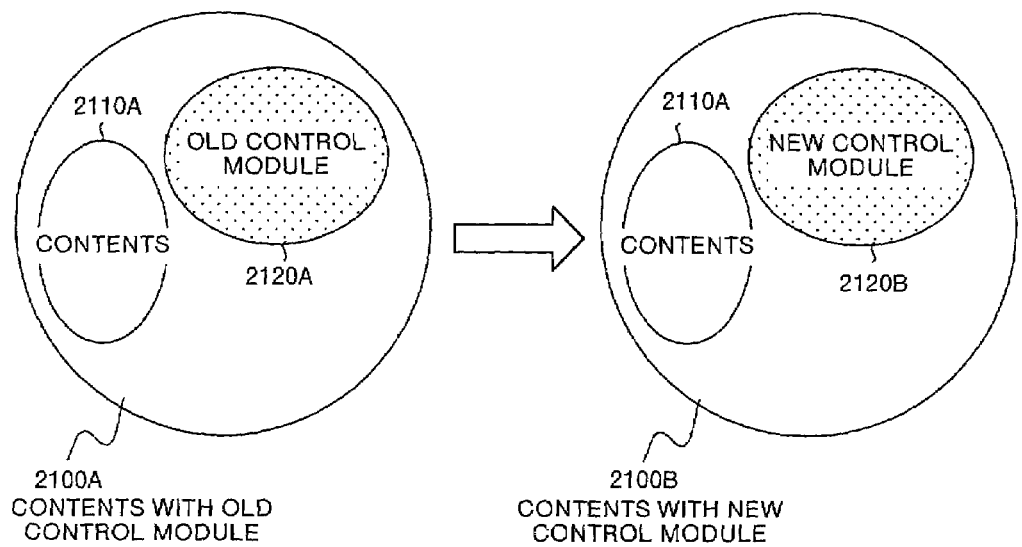
FIG. 24A and FIG. 24B are diagrams for explaining modified examples 4 and 5 of the same embodiment.

In the modified example 2 of the embodiment shown in FIG. 23A, the example of updating all of the control module and the contents has been explained. However, it is also possible to update only the control module. This case will be explained next as a modified example 4 of the embodiment. FIG. 24A is a diagram for explaining the modified example 4 of the embodiment.

In FIG. 24A, contents with control module 2100A are the contents before the updating, and the contents with control module 2100A consist of contents 2110A and an old control module 2120A. When the CPU and the like carry out the update processing of the old control module 2120A in this state, the contents with new control module 2100A are updated into contents with new control module 2100B. The contents with new control module 2100B consist of the contents with control module 2100A not updated, and a new control module 2120B after the updating (corresponding to the old control module 2120A).

Figure 24B:
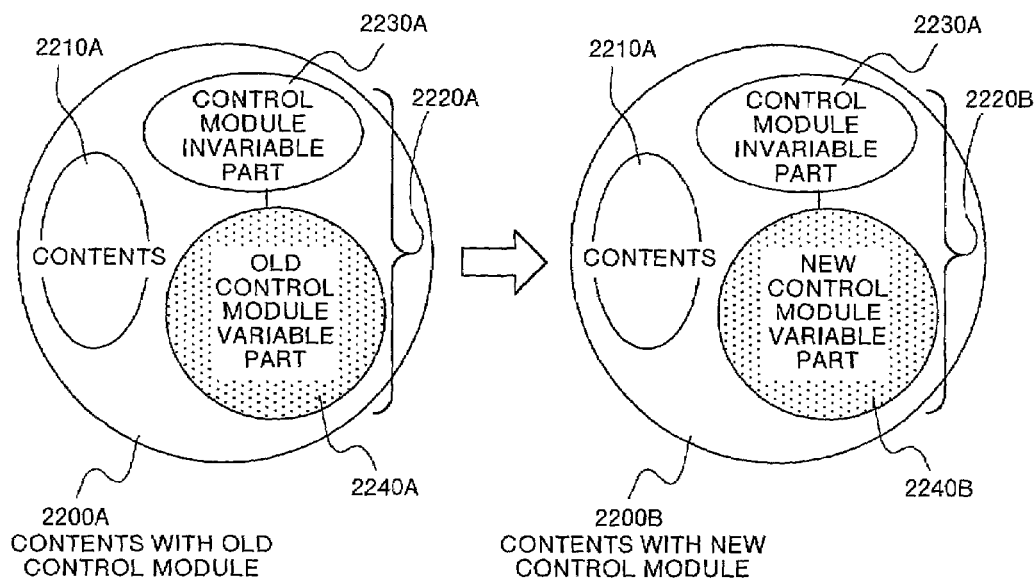

In the modified example 2 of the embodiment shown in FIG. 23A, the example of updating all of the control module and the contents has been explained. However, it is also possible to update a part of the control module. This case will be explained next as a modified example 5 of the embodiment. FIG. 24B is a diagram for explaining the modified example 5 of the embodiment.

In FIG. 24B, contents with old control module 2200A are the contents before the updating, and the contents with old control module 2200A consist of contents 2210A and an old control module 2220A. The old control module 2220A includes a control module invariable part 2230A that cannot be updated, and an old control module variable part 2240A that can be updated. When the CPU and the like carry out the update processing of the old control module variable part 2240A in this state, the contents with old control module 2200A are updated into contents with new control module 2200B.

The contents with new control module 2200B consist of the contents 2210A not updated, and a new control module 2220B after the updating (corresponding to the old control module 2220A). The new control module 2220B consists of the control module invariable part 2230A and a new control module variable part 2240B. The updated portion in the new control module 2220B is the new control module variable part 2240B.

Figure 25A:
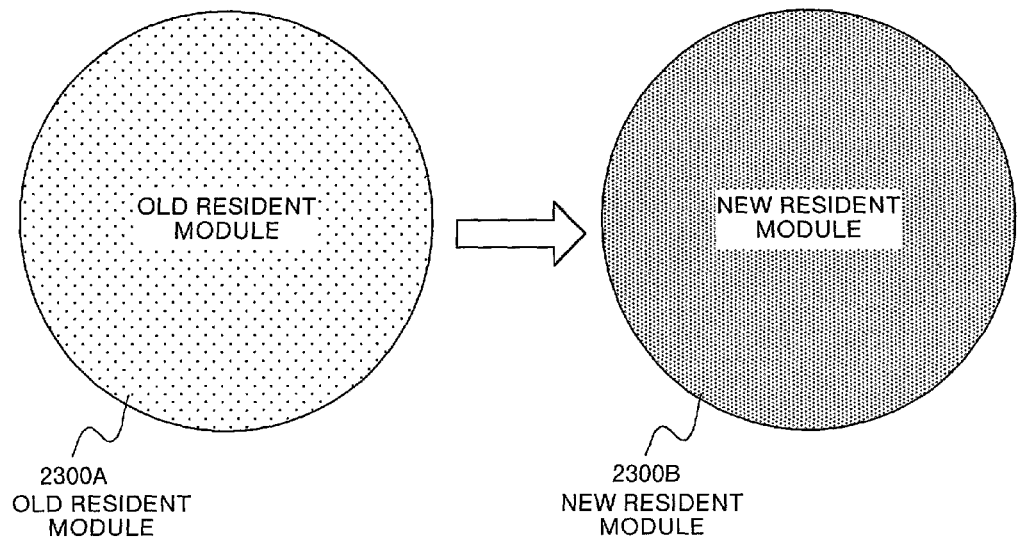
FIG. 25A and FIG. 25B are diagrams for explaining modified examples 6 and 7 of the same embodiment.

In the embodiment, a CPU, a control module, a resident module, etc. (hereinafter to be simply referred to as a CPU and the like) may update the resident module into a new resident module. This case will be explained next as a modified example 6 of the embodiment. FIG. 25A is a diagram for explaining the modified example 6 of the embodiment. An old resident module 2300A is a resident module before the updating. When the CPU and the like carry out the update processing in this state, the old resident module 2300A is updated into a new resident module 2300B. In the above-explained modified examples 1 to 5, it is also possible to update the resident module with control module, in stead of updating the contents with control module.

Figure 25B:
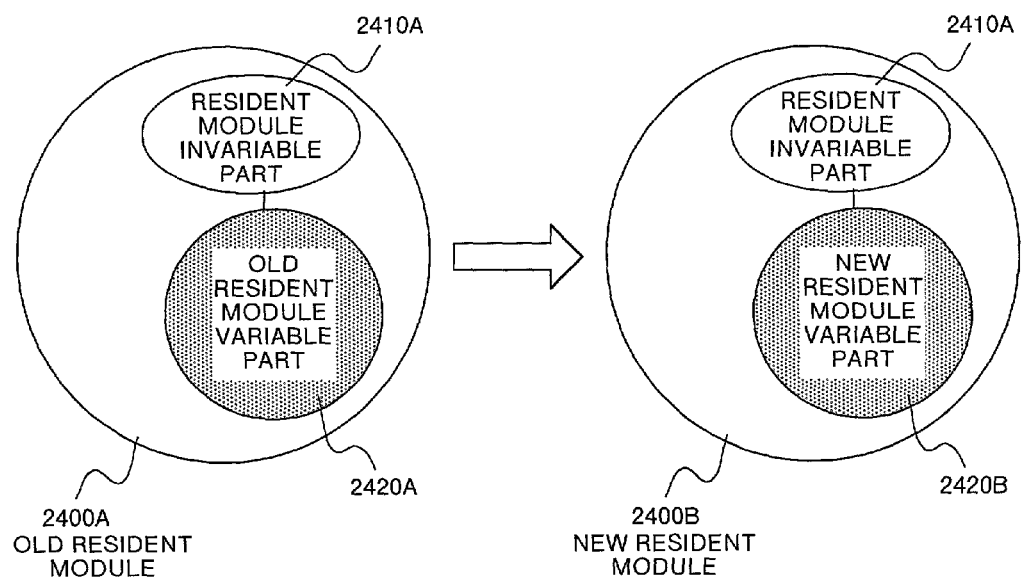

In the modified example 6 of the embodiment, the explanation has been made of the case where all portions of the resident module are updated. However, it is also possible to update a part of the resident module. This case will be explained below as a modified example 7. FIG. 25B is a diagram for explaining the modified example 7 of the embodiment.

In FIG. 25B, an old resident module 2400A consists of a resident module invariable part 2410A that is not updated, and an old-resident module variable part 2420A that can be updated. When the CPU and the like carry out the update processing of the old resident module variable part 2420A in this state, the old resident module 2400A is updated into a new resident module 2400B. This new resident module 2400B consists of a resident module invariable part 2410A that is not updated, and a new resident module variable part 2420B after the updating.

Figure 26:
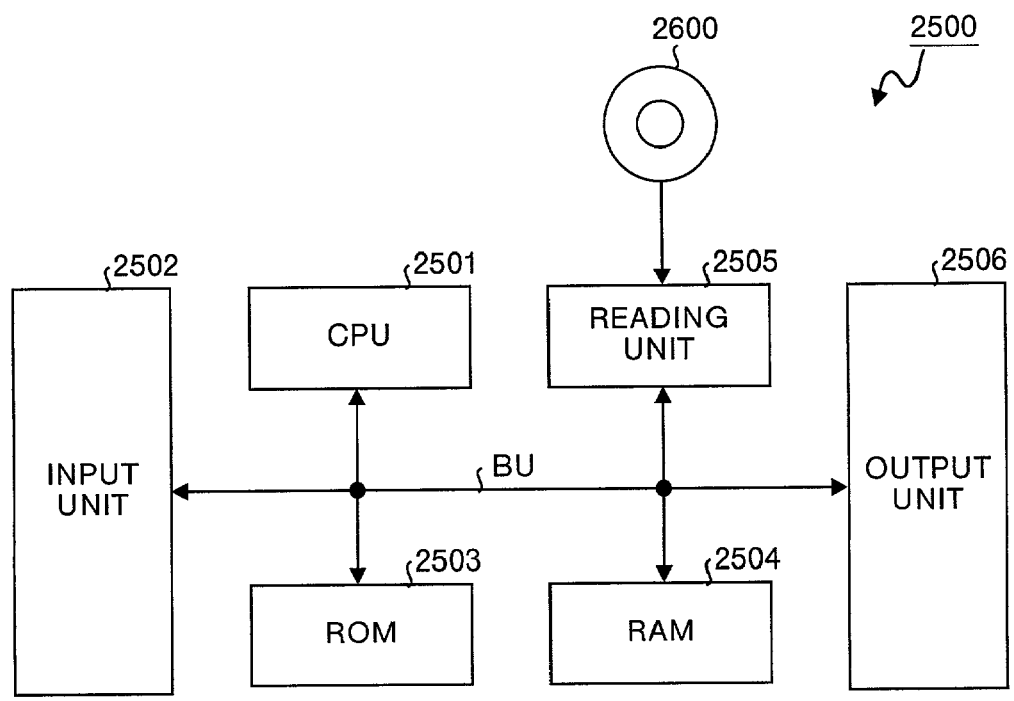
FIG. 26 is a block diagram showing a modified example 8 of the same embodiment.

In the present embodiment, as a modified example 8, it may be arranged such that a contents utilization control program for realizing the above-described contents utilization control is recorded onto a computer-readable recording medium 2600 shown in FIG. 26. Then, a computer 2500 shown in FIG. 26 reads the contents utilization control program recorded on the recording medium 2600, and executes this program, thereby to carry out the contents utilization control.

The computer 2500 shown in FIG. 26 consists of a CPU 2501 for executing the contents utilization control program, an input unit 2502 like a keyboard and a mouse, a ROM (Read-Only Memory) 2503 for recording various data, a RAM (Random Access Memory) 2504 for storing arithmetic parameters, a reading unit 2505 for reading the contents utilization control program from the recording medium 2600, an output unit 2506 like a display and a printer, and a bus BU for connecting between various unit.

The CPU 2501 reads the contents utilization control program recorded on the recording medium 2600 via the reading unit 2505, and executes the contents utilization control program thereby to carry out the contents utilization control. The recording medium 2600 includes a portable recording medium such as an optical disk, a floppy disk, and a hard disk, etc., and other transfer medium like a network that temporarily stores data.

In the above embodiment, the examples of the "source code format" and the "execution format" have been explained as the file format of the control module. However, the file format is not limited to these, and it is also possible to use other file format described in a script language like JAVA, SCRIPT, RERL, etc.

Further, in the above embodiment, a plurality of construction examples, operation examples, control modules, and resident modules have been explained. Any combination of these according to the needs is also included in the present invention.

As explained above, according to the present invention, the control relating to the utilization of the contents is carried out based on the cooperation between the first control module and the second control module. Therefore, there is an effect that it is possible to carry out a flexible utilization of the contents, without depending on the environment of the apparatus that utilizes the contents like the conventional practice.

Further, according to the present invention, the authentication is carried out between the first control module and the second control module. Based on a result of this authentication, the control relating to the utilization of the contents is carried out by cooperation between the first control module and the second control module. Therefore, there is an effect that it is possible to increase the level of security, and it is also possible to prevent unfair utilization of the contents.

Further, according to the present invention, the contents and the first control module are combined together to generate the contents with control module, and the contents with control module are transmitted to the external unit. Therefore, there is an effect that the external unit can carry out a flexible utilization of the contents without depending on the environment of the apparatus.

Further, according to the present invention, the contents with control module are transmitted based on a result of the authentication carried out between the resident module and the external unit. Therefore, there is an effect that it is possible to increase the level of security, and it is also possible to prevent an intentional erroneous transmission of the contents to a third party.

Further, according to the present invention, the control relating to the utilization of the contents with control module is carried out after the contents with control module transmitted from the external unit have been received. Therefore, there is an effect that the external unit can carry out a flexible utilization of the contents without depending on the environment of the apparatus.

Further, according to the present invention, the contents with control module are received based on a result of the authentication carried out between the resident module and the external unit. Therefore, there is an effect that it is possible to increase the level of security, and it is also possible to prevent an unintended erroneous reception of the contents.

Further, according to the present invention, a mutual authentication is carried out between the first control module and the second control module. The contents are utilized based on the license when the authentication has been carried out successfully. Therefore, there is an effect that it is possible to secure an extremely high level of security.

Further, according to the present invention, the first control module and the second respectively have a search function of searching a license with control module and contents with control module that have high relationship in the database. Then, the control regarding the utilization of the contents is carried out based on the cooperation of the searched information. Therefore, there is an effect that it is possible to easily utilize a plurality of kinds of contents without requiring a complex control at the apparatus side.

Further, according to the present embodiment, the second control module carries out an updating of the database. Therefore, there is an effect that it is possible to reduce the load of the apparatus regarding the management of the database.

Further, according to the present invention, a plurality of kinds of control regarding the utilization of the contents are carried out corresponding to a combination among the plurality of first sub-control modules and the plurality of second sub-control modules. Therefore, there is an effect that it is possible to carry out a flexible utilization of the contents, without depending on the environment of the apparatus that utilizes the contents like the conventional practice.

Further, according to the present invention, the second control module updates the charge information for the utilization of the contents. Therefore, there is an effect that it is possible to reduce the load on the management of the provision of the contents, as compared with the case of managing the charge by the contents provision right owner like the conventional practice.

Further, according to the present invention, the first control module and the second control module carry out the control relating to the utilization of the contents in hierarchy by using the contents collection with control module and the license collection with the control module. Therefore, there is an effect that it is possible to efficiently utilize a plurality of kinds of contents.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A contents utilization control apparatus, comprising:
a hardware input unit which inputs contents from a contents provision right owner, the contents comprising:
   a first software module further comprising:
      the contents, and
      a first software control module to dynamically control the contents and to interact with a second software control module, and
   a second software module further comprising:
      a license prepared from contents utilization approval information, and
      the second software control module to dynamically control the license and interact with the first software control module,
wherein the first software control module and the second software control module cooperate with each other to carry out a dynamic control relating to the utilization of the contents to contents users,
a third software control module for authenticating the first software control module and the second software control module, and for carrying out the control relating to the utilization of the contents based on a mutual cooperation between the first software control module and the second software control module; and
a hardware transmission unit which combines the contents with the first software control module, and transmits the combination to an external hardware unit, according to a control from the third software control module.

2. A contents utilization control apparatus, comprising:
a hardware input unit which inputs contents from a contents provision right owner, the contents comprising:
   a first software module further comprising:
      the contents, and
      a first software control module, and
   a second software module further comprising:
      a license prepared from contents utilization approval information, and
      a second software control module,
wherein the first software control module and the second software control module cooperate with each other to carry out a dynamic control relating to the utilization of the contents to contents users;
a third software control module for authenticating the first software control module and the second software control module, and for carrying out the control relating to the utilization of the contents based on a mutual cooperation between the first software control module and the second software control module; and
a hardware transmission unit which combines the contents with the first software control module, and transmits the combination to an external hardware unit, according to a control from the third software control module,
wherein the third software control module controls the hardware transmission unit based on a result of an authentication carried out between the third software control module and the external hardware unit.

3. A contents utilization control apparatus, comprising:
a hardware input unit which inputs contents from a contents provision right owner, the contents comprising:
   a first software module further comprising:
      the contents, and
      a first software control module, and
   a second software module further comprising:
      a license prepared from contents utilization approval information, and
      a second software control module,
wherein the first software control module and the second software control module cooperate with each other to carry out a dynamic control relating to the utilization of the contents to contents users;
a third software control module for authenticating the first software control module and the second software control module, and for carrying out the control relating to the utilization of the contents based on a mutual cooperation between the first software control module and the second software control module; and
a hardware transmission unit which combines the contents with the first software control module, and transmits the combination to an external hardware unit, according to a control from the third software control module,
wherein the hardware transmission unit and the external hardware unit mutually carry out encrypted communications regarding the combination, and the hardware transmission unit transmits the encrypted combination with a predetermined encryption key.

4. A contents utilization control apparatus, comprising:
a hardware input unit which inputs contents from a contents provision right owner, the contents comprising:
   a first software module further comprising:
      the contents, and
      a first software control module to dynamically control the contents and to interact with a second software control module, and
   a second software module further comprising:
      a license prepared from contents utilization approval information, and
      the second software control module to dynamically control the license and interact with the first software control module,
wherein the first software control module and the second software control module cooperate with each other to carry out a dynamic control relating to the utilization of the contents to contents users,
   a third software control module for authenticating the first software control module and the second software control module, and for carrying out the control relating to the utilization of the contents based on a mutual cooperation between the first software control module and the second software control module; and
a reception unit which receives the combination transmitted from an external hardware unit, and makes the control relating to the utilization of the contents by executing the first software control module according to the control of the third software control module.

5. A contents utilization control apparatus comprising:
a hardware input unit which inputs contents from a contents provision right owner, the contents comprising:
   a first software module further comprising:
      the contents, and
      a first software control module, and
   a second software module further comprising:
      a license prepared from contents utilization approval information, and
      a second software control module,
wherein the first software control module and the second software control module cooperate with each other to carry out a dynamic control relating to the utilization of the contents to contents users
a third software control module for authenticating the first software control module and the second software control module, and for carrying out the control relating to the utilization of the contents based on a mutual cooperation between the first software control module and the second software control module; and
a reception unit which receives the combination transmitted from an external hardware unit, and makes the control relating to the utilization of the contents by executing the first software control module according to the control of the third software control module,
wherein the third software control module controls the reception unit based on a result of an authentication carried out between the third software control module and the external hardware unit.

6. A contents utilization control apparatus comprising:
a hardware input unit which inputs contents from a contents provision right owner, the contents comprising:
   a first software module further comprising:
      the contents, and
      a first software control module, and
   a second software module further comprising:
      a license prepared from contents utilization approval information, and
      a second software control module,
wherein the first software control module and the second software control module cooperate with each other to carry out a dynamic control relating to the utilization of the contents to contents users
a third software control module for authenticating the first software control module and the second software control module, and for carrying out the control relating to the utilization of the contents based on a mutual cooperation between the first software control module and the second software control module; and
a reception unit which receives the combination transmitted from an external hardware unit, and makes the control relating to the utilization of the contents by executing the first software control module according to the control of the third software control module,
wherein the external hardware unit and the reception unit mutually carry out encrypted communications regarding the combination, and
the reception unit decrypts the encrypted combination with a predetermined decryption key.

7. A contents utilization control apparatus comprising:
a hardware input unit which inputs contents from a contents provision right owner, the contents comprising:
   a first software module further comprising:
      the contents, and
      a first software control module, and
   a second software module further comprising:
      a license prepared from contents utilization approval information, and
      a second software control module
wherein the first software control module and the second software control module cooperate with each other to carry out a dynamic control relating to the utilization of the contents to contents users; and
a true control software module equipped with a function identical to that of the first software control module,
wherein the first software module includes a virtual control software module for issuing a control request to the true control software module in place of the first software control module.

8. A contents utilization control apparatus, comprising:
a hardware input unit which inputs contents from a contents provision right owner, the contents comprising:
   a first software module further comprising:
      a plurality of contents forming a hierarchical structure, and
      a plurality of first software control modules corresponding to the plurality of contents respectively to dynamically control the corresponding contents and to interact with a corresponding second software control module, and
   a second software module further comprising:
      a plurality of licenses forming a hierarchical structure, each corresponding to utilization approval information for approving the utilization of corresponding one of the plurality of contents, and
      a plurality of second software control modules corresponding to the plurality of licenses respectively to dynamically control the corresponding license and to interact with the corresponding first software control module,
wherein the first software module and the second software module are stored in at least one file, and the first software control module and the second software control module carry out a dynamic control regarding the utilization of the contents in hierarchy by mutual cooperation.

9. The contents utilization control apparatus according to the claim 8,
wherein desired contents, a first software control module corresponding to the contents, a desired license, and a second software control module corresponding to the license can be extracted from the first software module and the second software module respectively, and
the contents, the first software control module, the license, and the second software control module are utilized/distributed as contents with the first software module and the second software module respectively.

10. A contents utilization control apparatus comprising:
a hardware input unit which inputs contents from a contents provision right owner, the contents comprising:
a first software module further comprising:
a plurality of contents forming a hierarchical structure, and
a plurality of first software control modules corresponding to the plurality of contents respectively, and
a second software module further comprising:
a plurality of licenses forming a hierarchical structure, each corresponding to utilization approval information for approving the utilization of corresponding one of the plurality of contents, and
a plurality of second software control modules corresponding to the plurality of licenses respectively,
wherein the first software module and the second software module are stored in at least one file, and
the first software control module and the second software control module carry out a dynamic control regarding the utilization of the contents in hierarchy by mutual cooperation; and
a true control software module equipped with a function identical to that of the first software control module,
wherein the first software module has a virtual control software module for issuing a control request to the true control software module in place of the first software module.

11. A contents utilization control methods, comprising:
inputting contents from a contents provision right owner, the contents comprising:
a first software module further comprising:
the contents, and
a first software control module to dynamically control the contents and to interact with a second software control module, and
a second software module further comprising:
a license prepared from contents utilization approval information, and
the second software control module to dynamically control the license and to interact with the first software control module, and
wherein the first software control module and the second software control module cooperate with each other to carry out a dynamic control relating to the utilization of the contents to contents users;
authenticating with a third software control module the first software module and the second software module, and carrying out a control relating to the utilization of the contents based on a mutual cooperation between the first software control module and the second software control module;

combining the contents with the first software control module; and
transmitting the combination to an external hardware unit, according to a control from the third software control module.

12. A contents utilization control method, comprising:
inputting contents from a contents provision right owner, the contents comprising:
a first software module further comprising:
the contents, and
a first software control module to dynamically control the contents and to interact with a second software control module, and
a second software module further comprising:
a license prepared from contents utilization approval information, and
the second software control module to dynamically control the license and to interact with the first software control module, and
wherein the first software control module and the second software control module cooperate with each other to carry out a dynamic control relating to the utilization of the contents to contents users;
authenticating with a third software control module the first software module and the second software module, and carrying out a control relating to the utilization of the contents based on a mutual cooperation between the first software control module and the second software control module;
receiving the combination transmitted from an external hardware unit; and
making the control relating to the utilization of the contents by executing the first software control module, according to the control of the third software control module.

13. A contents utilization control method, comprising:
inputting contents from a contents provision right owner, the contents comprising:
a first software module further comprising:
a plurality of contents forming a hierarchical structure, and
a plurality of first software control modules corresponding to the plurality of contents respectively to dynamically control the corresponding contents and to interact with a corresponding second software control module, and
a second software module further comprising:
a plurality of licenses forming a hierarchical structure, each corresponding to utilization approval information for approving the utilization of corresponding one of the plurality of contents, and
a plurality of second software control modules corresponding to the plurality of licenses respectively to dynamically control the corresponding license and to interact with the corresponding first software control module,
wherein the first software module and the second software module are stored in at least one file, and
the first software control module and the second software control module carry out a dynamic control regarding the utilization of the contents in hierarchy by mutual cooperation.

14. The contents utilization control method according to the claim 13,
wherein desired contents, a first software control module corresponding to the contents, a desired license, and a second software control module corresponding to the license can be extracted from the first software module and the second software module respectively, and the contents, the first software control module, the license, and the second software control module are utilized/distributed as contents with the first software module and the second software module respectively.

15. A computer readable medium for storing instructions, which when executed by a computer, causes the computer to perform:

inputting contents from a contents provision right owner, the contents comprising:

a first software module further comprising:

a plurality of contents forming a hierarchical structure, and a plurality of first software control modules corresponding to the plurality of contents respectively to dynamically control the corresponding contents and to interact with a corresponding second software control module, and a second software module further comprising:

a plurality of licenses forming a hierarchical structure, each corresponding to utilization approval information for approving the utilization of corresponding one of the plurality of contents, and a plurality of second software control modules corresponding to the plurality of licenses respectively to dynamically control the corresponding license and to interact with the corresponding first software control module, wherein the first software module and the second software module are stored in at least one file, and the first software control module and the second software control module carry out a dynamic control regarding the utilization of the contents in hierarchy by mutual cooperation.

* * * * *

UNITED STATES PATENT AND TRADEMARK OFFICE
CERTIFICATE OF CORRECTION

| | | |
|---|---|---|
| PATENT NO. | : 7,477,742 B2 | Page 1 of 1 |
| APPLICATION NO. | : 09/799010 | |
| DATED | : January 13, 2009 | |
| INVENTOR(S) | : Bintatsu Noda et al. | |

It is certified that error appears in the above-identified patent and that said Letters Patent is hereby corrected as shown below:

Column 26, Line 33, change "module" to --module,--.

Column 27, Line 44, change "methods" to --method--.

Signed and Sealed this

Twenty-fourth Day of March, 2009

JOHN DOLL
*Acting Director of the United States Patent and Trademark Office*